United States Patent
Glaser et al.

(10) Patent No.: US 10,569,516 B2
(45) Date of Patent: Feb. 25, 2020

(54) MULTILAYERED SHEET

(71) Applicant: Bemis Company, Inc., Neenah, WI (US)

(72) Inventors: Kevin D. Glaser, Appleton, WI (US); Ayomide O. Odusanya, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 290 days.

(21) Appl. No.: 15/574,510

(22) PCT Filed: Jun. 8, 2015

(86) PCT No.: PCT/US2015/034667
§ 371 (c)(1),
(2) Date: Nov. 16, 2017

(87) PCT Pub. No.: WO2016/200363
PCT Pub. Date: Dec. 15, 2016

(65) Prior Publication Data
US 2018/0126713 A1 May 10, 2018

(51) Int. Cl.
B32B 27/32 (2006.01)
B32B 7/12 (2006.01)
B32B 27/08 (2006.01)
B32B 27/30 (2006.01)
B32B 27/36 (2006.01)

(52) U.S. Cl.
CPC ............... *B32B 27/32* (2013.01); *B32B 7/12* (2013.01); *B32B 27/08* (2013.01); *B32B 27/302* (2013.01); *B32B 27/306* (2013.01); *B32B 27/36* (2013.01); *B32B 2250/02* (2013.01); *B32B 2250/24* (2013.01); *B32B 2255/10* (2013.01); *B32B 2255/26* (2013.01); *B32B 2270/00* (2013.01); *B32B 2307/308* (2013.01); *B32B 2307/52* (2013.01); *B32B 2307/5825* (2013.01); *B32B 2307/702* (2013.01); *B32B 2307/704* (2013.01); *B32B 2307/732* (2013.01); *B32B 2307/738* (2013.01); *B32B 2439/00* (2013.01); *B32B 2439/02* (2013.01); *B32B 2553/00* (2013.01)

(58) Field of Classification Search
CPC ..... B32B 27/32; B32B 27/306; B32B 27/302; B32B 27/08; B32B 7/12; B32B 27/36
See application file for complete search history.

(56) References Cited

U.S. PATENT DOCUMENTS

| | | |
|---|---|---|
| 3,429,854 A | 2/1969 | Siggel et al. |
| 4,127,631 A | 11/1978 | Dempsey et al. |
| 4,440,824 A | 4/1984 | Bonis |
| 4,463,121 A | 7/1984 | Gartland et al. |
| 4,508,875 A | 4/1985 | Kishida et al. |

(Continued)

FOREIGN PATENT DOCUMENTS

EP 2520615 A1 11/2012

*Primary Examiner* — Samir Shah
(74) *Attorney, Agent, or Firm* — Lynn M. Nett

(57) ABSTRACT

A multilayered sheet is described. The sheet comprises a first layer comprising a polyolefin having a melting temperature, a storage modulus (G) greater than 100,000 psi (690 MPa) at ambient temperature, and a glass transition temperature less than ambient temperature; and a second layer comprising a polymer having a glass transition temperature greater than ambient temperature.

18 Claims, 4 Drawing Sheets

(56) References Cited

U.S. PATENT DOCUMENTS

| | | | |
|---|---|---|---|
| 4,972,015 A | 11/1990 | Carico et al. | |
| 5,527,622 A | 6/1996 | Kato et al. | |
| 5,765,710 A | 6/1998 | Bergerioux | |
| 5,958,486 A * | 9/1999 | Ringdahl | A23L 3/02 |
| | | | 426/126 |
| 6,964,816 B2 | 11/2005 | Schell et al. | |
| 7,201,966 B2 | 4/2007 | Lischefski | |
| 8,394,474 B2 | 3/2013 | Bekele | |
| 8,449,984 B2 | 5/2013 | Lischefski et al. | |
| 2007/0166436 A1 | 7/2007 | Kvamme et al. | |
| 2007/0259142 A1 | 11/2007 | Lischefski et al. | |
| 2008/0063821 A1 | 3/2008 | Galloway | |
| 2011/0104342 A1 | 5/2011 | Glaser et al. | |
| 2011/0104483 A1 | 5/2011 | Shinozaki et al. | |
| 2013/0280507 A1 | 10/2013 | Kondo | |

\* cited by examiner

MULTILAYERED SHEET

BACKGROUND OF THE INVENTION

The present application describes a multilayered sheet, specifically a multilayered sheet that may be both thermoformable and thermally stable.

Packaging film and packaging sheet are used for many purposes. One of these many purposes includes thermoforming the film or sheet into packages, such as trays, plates or other containers, which may then be used to package products. Another of these many purposes includes packaging products subjected to thermal processing, including but not limited to retort, aseptic, hot-fill or microwave processing.

One packaging sheet that is currently used for thermoforming into packages is disclosed in U.S. Patent Application Publication Pub. No. US 2011/0104342 (published May 5, 2011). This sheet comprises a first rigid component and a second rigid component and has a normalized combined tear initiation and propagation resistance in both machine direction and transverse direction of less than about 0.115 in*lbf/mil (0.0511 Ncm/micron) energy to break and an elongation in both machine direction and transverse direction of less than about 0.800%/mil (0.0315%/micron) as measured in accordance with ASTM D1004. The first rigid component and the second rigid component are exemplified by identical blends of high impact polystyrene (HIPS) and general purpose polystyrene (GPPS). Thermoformed packages formed from this sheet having a first rigid component having an analogous composition as a second rigid component are expected to distort and deform when exposed to temperatures above 194° F. (about 90° C.) due to the presence of the polystyrene. One sheet that is currently used for thermoformed packages exposed to temperatures above 194° F. (about 90° C.) comprises a sheet having two exterior layers of polypropylene. However, a sheet with two exterior layers of polypropylene is expected to be difficult to thermoform. Additionally, the methods of manufacturing a sheet with two layers of polypropylene are expected to be limited due to polypropylene's crystallinity and other properties. What is needed is a sheet that may be both thermoformable and thermally stable.

BRIEF SUMMARY OF THE INVENTION

This need is met by the multilayered sheet described in the present application. The sheet comprises a first layer comprising a polyolefin having a melting temperature, a storage modulus ($G'_1$) greater than about 100,000 psi (about 690 MPa) at ambient temperature, and a glass transition temperature less than ambient temperature. The sheet further comprises a second layer comprising a polymer having a glass transition temperature greater than ambient temperature. The first layer comprises different materials than the second layer. The melting temperature of the polyolefin of the first layer is greater than the glass transition temperature of the polymer of the second layer. Each of the polyolefin of the first layer and the polymer of the second layer has a storage modulus ($G'_1$ and $G'_2$, respectively) at about 35° C. and a storage modulus (G') at a midpoint temperature that is the average of the glass transition temperature of the polymer of the second layer and the melting temperature of the polyolefin of the first layer. The ratio of $G'_1$ to $G'_2$ at about 35° C. is less than 1, and the ratio of $G'_1$ to $G'_2$ at the midpoint temperature is greater than one. The sheet has a thickness equal to or greater than 10 mil (254 micron). In some embodiments, the sheet has a thickness of from about 30 mil (about 762 micron) to about 50 mil (about 1270 micron). The first layer contributes at least about 30% of the thickness of the sheet and the second layer contributes at least about 25% but less than about 60% of the thickness of the sheet. In some embodiments, the first layer contributes from about 30% to about 65% of the thickness of the sheet and the second layer contributes from about 25% to about 55% of the thickness of the sheet.

In some embodiments, the polyolefin of the first layer may comprise polypropylene, high density polyethylene or blends of such. As a non-limiting example, the polyolefin of the first layer may comprise from about 50% (by weight) to about 70% (by weight) polypropylene homopolymer and from about 30% (by weight) to about 50% (by weight) high density polyethylene.

In some embodiments, the polymer of the second layer may comprise polyester, cyclic olefin copolymer, styrenic polymers or blends of such. More specifically, as non-limiting examples, the polymer of the second layer may comprise amorphous or semi-crystalline polyester (APET), glycol-modified polyethylene terephthalate (PETG), isophthalic acid (IPA)-modified co-polyester (PETI), polylactic acid (PLA), copolyesters, high impact polystyrene (HIPS), general purpose polystyrene (GPPS), styrene block copolymer (SBC) or blends of such.

In some embodiments, the sheet may include a first layer comprising from about 50% (by weight) to about 70% (by weight) polypropylene homopolymer and from about 30% (by weight) to about 50% (by weight) high density polyethylene and a second layer comprising amorphous or semi-crystalline polyester (APET).

In some embodiments, each of the first layer and the second layer of the sheet may be an exterior layer or an interior layer. In a further embodiment, the second layer may be an interior layer bonded to an exterior layer via an intermediate layer.

In some embodiments, the sheet may comprise an adhering layer positioned between the first layer and the second layer. As non-limiting examples, this adhering layer may comprise an adhesive, an extrudate, a coating, a tie material or a multilayer film. In a further embodiment, as a non-limiting example, the adhering layer may comprise a multilayer, blown film.

The sheet described in the present application may have various properties. As non-limiting examples, the sheet may have a normalized combined tear initiation and propagation resistance in both machine direction and transverse direction of greater than about 0.115 in*lbf/mil (0.0511 Ncm/micron) energy to break and an elongation in both machine direction and transverse direction of greater than about 0.800%/mil (0.0315%/micron) as measured in accordance with ASTM D1004. The sheet may have between 0 and about 20 degrees of transverse direction curl. The sheet may be thermoformable and, as such may be thermoformed into a package. Such package may exhibit a compression strength that is greater than about 125% of a compression strength of an other package formed from an other sheet having an other first layer comprising the same polyolefin and having an analogous composition as an other second layer, wherein the other first layer contributes at least about 30% of the thickness of the other sheet and the other second layer contributes at least about 25% but less than about 60% of the thickness of the other sheet. In some embodiments, this compression strength may be from about 150% to about 300% of the compression strength of the other package. The sheet may be thermally stable when exposed to temperatures from about 194° F. (about 90° C.) to about 284° F. (about 140° C.). As such, the sheet may form a package for retort, aseptic, hot-fill or microwave processing.

DETAILED DESCRIPTION OF THE INVENTION

Figure 1:
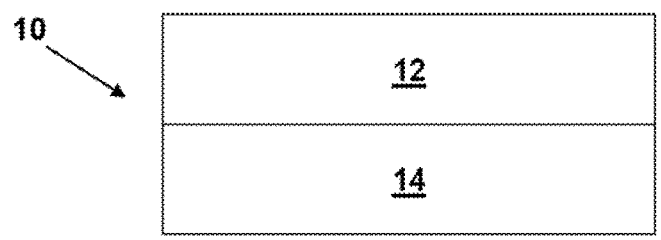
FIG. 1 is a cross-sectional view of a first embodiment of a thermoplastic sheet according to the present application.

As used throughout this application, the term "sheet" refers to a plastic web having a thickness of equal to or greater than about 10 mil (about 254 micron). The term "film" refers to a plastic web having a thickness of less than about 10 mil (about 254 micron).

As used throughout this application, the term "about" refers to approximately, rounded up or down to, reasonably close to, in the vicinity of, or the like. The term "approximate" is synonymous with the term "about." Unless the context specifically requires otherwise, each quantified property (e.g., temperature, melting temperature, glass transition temperature, storage modulus, etc.) cited or referenced in this application is qualified by "about," whether or not "about" appears before the quantified property.

As used throughout this application, the term "thermoplastic" refers to a polymer or polymer mixture that softens when exposed to heat and then returns to its original condition when cooled to room temperature. In general, thermoplastic materials may include natural or synthetic polymers. Thermoplastic materials may further include any polymer that is cross-linked by either radiation or chemical reaction during manufacturing or post-manufacturing processes.

As used throughout this application, the term "polyolefin" (or "polyalkene") refers to any of a class of polymers produced from an alkene (or "olefin") with the general formula $C_nH_{2n}$.

As used throughout this application, the term "polymer" refers to a material which is the product of a polymerization or copolymerization reaction of natural, synthetic or combined natural and synthetic monomers and/or co-monomers and is inclusive of homopolymers, copolymers, terpolymers, quaterpolymers, etc. In general, the layers of the sheet described in the present application may comprise a single polymer, a mixture of a single polymer and non-polymeric material, a combination of two or more polymers blended together, a mixture of a blend of two or more polymers and non-polymeric material, or other such components. It will be noted that many polymers may be synthesized by the mutual reaction of complementary monomers. It will also be noted that some polymers are obtained by the chemical modification of other polymers such that the structure of the macromolecules that constitute the resulting polymer can be thought of as having been formed by the homopolymerization of a hypothetical monomer.

As used throughout this application, the term "storage modulus" or "G'" refers to a measure of the elastic response of a material and may also be called also called the elastic modulus, the in-phase modulus, and the real modulus. This value is only ideally equivalent to Young's modulus. In reality (versus ideality), Young's modulus is calculated over a range of stresses and strains (as it is the slope of a line), while storage modulus is a point on the line. Furthermore, in reality, Young's modulus is determined via the stress-strain test and involves constantly stretching a material, while storage modulus is determined via the dynamic test and involves oscillating a material. As an example, if the material to be tested were a ball, the storage modulus (the elasticity) could be related to the amount of energy the ball gives back (how high it bounces). Therefore, as used throughout this application, storage modulus is different than Young's modulus.

As used throughout this application, the term "ambient temperature" generally refers to a surrounding environment or room temperature of about 68-77° F. (about 20-25° C.).

As used throughout this application, the term "rigid" refers to a plastic material having a storage modulus greater than about 100.000 psi (about 690 MPa) at ambient temperature.

As used throughout this application, the term "melting point" (or "melting temperature") refers to the temperature at which a solid and a liquid phase of a material may coexist in equilibrium. It is the temperature at which a solid melts to become a liquid and the material flows or begins to flow.

As used throughout this application, the term "glass transition temperature" or "$T_g$" refers to the temperature range over which a material transitions from a glassy state to a rubbery state (i.e., the temperature range over which a material "softens"). It is noted by the onset decrease in the storage modulus, accompanied by a peak in tan delta, during temperature scan heating. The glass transition temperature is, in actuality, a range. However, scientists have agreed to accept a single temperature as the indicator per certain standards, such as those associated with differential scanning calorimetry (DSC), thermomechanical analysis (TMA) and dynamic mechanical analysis (DMA).

As used throughout this application, the term "midpoint temperature" refers to the temperature half-way between the glass transition temperature ($T_g$) of the polymer of the second layer and the melting temperature ($T_m$) of the polyolefin of the first layer. In other words, midpoint temperature is the average of the glass transition temperature ($T_g$) of the polymer of the second layer and the melting temperature ($T_m$) of the polyolefin of the first layer As used throughout this application, the term "polyester" refers to a homopolymer or copolymer having an ester linkage between monomer units. The ester linkage can be represented by the general formula: $[O-R-OC(O)-R'-C(O)]_n$ where R and R' are the same or different alkyl (or aryl) group and may be generally formed from the polymerization of dicarboxylic acid and diol monomers. The dicarboxylic acid (including the carboxylic acid moieties) may be linear or aliphatic (e.g., lactic acid, oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid and naphthalic acid). Specific examples of a useful diol include but are not limited to ethylene glycol, propylene glycol, trimethylene glycol, 1,4-butane diol, neopentyl glycol, cyclohexane diol, 2,2,4,4-tetramethyl-1,3-cyclobutanediol, and the like. Polyesters may include a homopolymer or copolymer of alkyl-aromatic esters, including but not limited to polyethylene terephthalate (PET), amorphous polyethylene terephthalate (APET), glycol-modified polyethylene terephthalate (PETG), and polybutylene terephthalate (PBT); a copolymer of terephthalate and isophthalate including but not limited to polyethylene terephthalate/isophthalate copolymer, such as isophthalic acid (IPA) (modified polyethylene terephthalate (PETI)); a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials.

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to terpolymers, quaterpolymers, etc.

As used throughout this application the term "cyclic olefin copolymer" or 'COC' refers to a class of polymeric materials based on cyclic olefin monomers and ethane, with one or more different cyclic olefin units randomly or alternately attached to an ethylene polymer backbone. Ethylene/norbornene copolymers are a non-limiting example of cyclic olefin copolymers.

As used throughout this application, the term "polystyrene" or "PS" or "styrenic polymer" refers to a homopolymer or copolymer having at least one styrene monomer linkage (such as benzene (i.e., $C_6H_6$) having an ethylene substituent) within the repeating backbone of the polymer. The styrene linkage can be represented by the general formula: $[CH_2-CH_2(C_6H_5)]_n$.

As used throughout this application, the term "polypropylene" or "PP" refers to a plastomer, homopolymer or copolymer having at least one propylene monomer linkage within the repeating backbone of the polymer. The propylene linkage can be represented by the general formula: $[CH2-CH(CH3)]_n$. Such propylene may be a polypropylene impact copolymer, a polypropylene random copolymer or a polypropylene homopolymer, may be syndiotactic or isotactic and/or may or may not be clarified.

As used throughout this application, the term "high density polyethylene" or "HDPE" refers to both (a) homopolymers of ethylene which have densities from about 0.960 g/cc to about 0.970 g/cc and (b) copolymers of ethylene with at least one alpha-olefin (e.g., 1-butene or 1-hexene) which have densities from about 0.940 g/cc to about 0.958 g/cc. HDPE includes polymers made with Ziegler or Phillips type catalysts and polymers made with single-site metallocene catalysts. HDPE also includes high molecular weight "polyethylenes." Non-limiting examples of high density polyethylene useful in various embodiments of the present application include those having a density of from about 0.950 g/cc to about 0.970 g/cc.

As used throughout this application, the terms "copolymer of ethylene with at least one alpha-olefin" or "ethylene alpha-olefin copolymer" refer to a modified or unmodified copolymer produced by the co-polymerization of ethylene and any one or more alpha-olefins. Suitable alpha-olefins include, for example, $C_3$ to $C_{20}$ alpha-olefins such as propene, 1-butene, 1-pentene, 1-hexene, 1-octene, 1-decene and blends of such. The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum. Additionally, the co-polymerization of ethylene and an alpha-olefin may also be produced by homogeneous catalysis, such as co-polymerization reactions with metallocene catalysis systems which include constrained geometry catalysts, (e.g., monocyclopentadienyl transition-metal complexes). In general, homogeneous catalyzed ethylene alpha-olefin copolymers may be characterized by one or more methods known in the art, including but not limited to molecular weight distribution ($M_w/M_n$), composition distribution breadth index (CDBI), narrow melting point range and single melting point behavior.

As used throughout this application, the term "modified" refers to a chemical derivative, whether grafted onto a polymer, copolymerized with a polymer or blended with one or more polymers. The term also includes derivatives of such functionalities, such as acids, esters and metal salts derived from such.

As used throughout this application, the term "layer" refers to a discrete film or sheet component which may or may not be coextensive with the film or sheet but has a substantially uniform composition. In referring to a monolayer film or monolayer sheet, "film" and "layer" or "sheet" and "layer" are synonymous.

As used throughout this application, the term "exterior layer" refers to a layer comprising the outermost surface of a film, sheet or other article relative to the contents of the filled package (i.e., the layer of the film, sheet or other article farthest from the contents of the filled package). The term "interior layer" refers to a layer comprising the innermost surface of a film, sheet or other article relative to the contents of the filled package (i.e., the layer of the film, sheet or other article, closet to the contents of the filled package). Additionally, the exterior layer and the interior layer each have an inner surface and an outer surface. The term "inner surface" refers to a surface touching another layer, and the term "outer surface" refers to a surface not touching another layer.

As used throughout this application, the term "intermediate layer" refers to a layer that is positioned between two other layers. An intermediate layer has two inner surfaces.

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate or otherwise. The term "polyethylene" or "PE" is used without regard to the presence or absence of substituent branch groups.

As used throughout this application, the term "tie material" refers to a polymeric material serving a primary purpose or function of adhering two surfaces to one another, presumably the planar surfaces of two sheet or film layers. A tie material may adhere one sheet or film layer surface to another sheet or film layer surface or may adhere one area of a sheet or film layer surface to another area of the same sheet or film layer surface As used throughout this application, the term "multilayer" refers to a plurality of layers in a single structure generally in the form of a film or sheet which may be made from a polymeric material or a non-polymeric material bonded together by any conventional means known in the art (e.g., coextrusion, lamination, coating or blends of such).

As used throughout this application, the term "structural layer" or "bulk layer" refers to a layer that creates or provides structural support, substance or stability to the sheet or a layer that simply provides desired thickness for the sheet.

As used throughout this application, the term "blown film" refers to a film produced by the blown coextrusion process. In the blown coextrusion process, streams of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel, and then rapidly cooled or quenched by any of various methods known to those of skill in the art.

As used throughout this application, the term "sealant layer" refers to a layer of a film, sheet, etc. involved in the sealing of the film, sheet, etc. to itself and/or to another layer of the same or another film, sheet, etc.

As used throughout this application, the term "barrier" refers to any material which controls a permeable element of a film or a sheet and includes but is not limited to oxygen barrier, moisture barrier, chemical barrier, heat barrier and odor barrier.

As used throughout this application, the term "thermoformable" refers to a sheet capable of being formed or thermoformed into a desired shape by the application of a differential pressure between the sheet and a mold, by the application of heat, by the combination of the application of heat and a differential pressure between the sheet and a mold, or by any thermoforming technique known to those skilled in the art.

As used throughout this application, the term "package" refers to any article used to wholly or partially surround or contain an item. A package may take many, various forms. For example, the term "package" may include pouches that wholly surround or contain an item (or items) to be packaged. The term "package" may also include films, sheets, etc. that partially surround or contain an item (or items) to be packaged and, when used in conjunction with another film, sheet, etc. wholly surround or contain an item (or items). The term package may further include cups, trays, plates or other containers formed by thermoforming a sheet or film.

As used throughout this application, the term "thermally stable" refers to an article capable of maintaining dimensionality and shape and not distorting or deforming when exposed to temperatures from about 194° F. (about 90° C.) to about 284° F. (about 140° C.).

As used throughout this application, the term "retort" refers to a sterilization process in which a food item packaged in a flexible package is heated to about 220-250° F. (about 104-121° C.) or higher for several minutes under high pressure.

As used throughout this application, the term "aseptic" refers to a process in which a packaged product and its packaging component(s) are sterilized separately and then combined in a sterile or sterilized environment to form a shelf-stable package.

As used throughout this application, the term "hot-fill" refers to a process in which a packaged component (e.g., liquid such as juice or other beverage) is heated to about 194-203° F. (about 90-95° C.) and then packaged (e.g., dispensed into a package) and sealed at a slightly lower temperature (e.g., about 180-185° F. (about 82-85° C.)).

As used throughout this application, the term "microwave" refers to a process in which electromagnetic waves heat water in food to the boiling point of water (about 212° F. (about 100° C.).)

Referring now to the drawings, with some but not all embodiments shown, with elements depicted as illustrative and not necessarily to scale, and with the same (or similar) reference numbers denoting the same (or similar) features throughout the drawings, FIG. 1 is a cross-sectional view of a first embodiment of a thermoplastic sheet according to the present application. Sheet 10 depicted in FIG. 1 is a generalized embodiment and comprises first layer 12 and second layer 14.

First layer 12 comprises a polyolefin which has (a) some degree of crystallinity and, therefore, has a melting temperature, (b) a storage modulus ($G'_1$) greater than about 100,000 psi (about 690 MPa) at ambient temperature (i.e., about 68-77° F. (about 20-25° C.)), and (c) a glass transition temperature less than ambient temperature (i.e., about 68-77° F. (about 20-25° C.)).

As the polyolefin of first layer 12 has a storage modulus ($G'_1$) greater than about 100,000 psi (about 690 MPa) at ambient temperature (i.e., about 68-77° F. (about 20-25° C.)), the polyolefin is, by definition, a rigid material. In some embodiments, the polyolefin of first layer 12 may have a storage modulus from greater than about 100,000 psi (about 690 MPa) to about 500,000 psi (about 3,450 MPa) at ambient temperature.

In some embodiments, the polyolefin of first layer 12 may comprise polypropylene, high density polyethylene, or blends of such. As non-limiting examples, first layer 12 may comprise any one of the following:

100% (by weight) polypropylene homopolymer;

100% (by weight) high density polyethylene;

from about 60% (by weight) to about 90% (by weight) polypropylene homopolymer and from about 10% (by weight) to about 40% (by weight) polypropylene random copolymer;

from about 70% (by weight) to about 80% (by weight) polypropylene homopolymer and from about 20% (by weight) to about 30% (by weight) polypropylene random copolymer;

from about 40% (by weight) to about 80% (by weight) polypropylene homopolymer and from about 20% (by weight) to about 60% (by weight) high density polyethylene; or from about 50% (by weight) to about 70% (by weight) polypropylene homopolymer and from about 30% (by weight) to about 50% (by weight) high density polyethylene.

Examples of polypropylene include but are not limited to polypropylene impact copolymer, polypropylene random copolymer and polypropylene homopolymer. Further non-limiting examples of polypropylene useful in various embodiments of the present application include syndiotactic or isotactic polypropylene. Polypropylene has a reported melting temperature of 119-186° C. (See Howe, "Polypropylene, isotactic," *Polymer Data Handbook*, 1999, pp. 780-786 (Oxford University Press, Inc., New York, N.Y.); and Myers, "Polypropylene, syndiotactic," *Polymer Data Handbook*, 1999, pp. 798-801 (Oxford University Press, Inc., New York, N.Y.).) Polypropylene homopolymer has a reported storage modulus of 1,400 MPa (about 203,053 psi) at 20° C. (30 Hz). (See Howe, "Polypropylene, isotactic," *Polymer Data Handbook*, 1999, pp. 780-786 (Oxford University Press, Inc., New York, N.Y.).) Based on a review of literature, polypropylene has a reported glass transition temperature of −60-10° C. Examples of polypropylene impact copolymer include but are not limited to Polypropylene 4170 and Polypropylene 4481WZ, both of which are available from Total Petrochemicals & Refining USA, Inc. (Houston, Tex.). Examples of polypropylene random copolymer include but are not limited to Polypropylene RP650, which is available from Braskem (Philadelphia, Pa.); and Polypropylene 6281KX, which is available from Total Petrochemicals & Refining USA, Inc. (Houston, Tex.). Examples of polypropylene homopolymer include but are not limited to Inspire® 6021N and Polypropylene H110-02NZ, both of which are available from Braskem (Philadelphia, Pa.); and Polypropylene Lumicene® M3382MZ, which is available from Total Petrochemicals & Refining USA, Inc. (Houston, Tex.).

Examples of high density polyethylene include homopolymers and copolymers of ethylene. High density polyethylene is available in a wide range of molecular weights as determined by either melt index (MI) or HLMI (high-load melt index). (See Carter, "Polyethylene, High-Density," *The Wiley Encyclopedia of Packaging Technology*, Second Edition, 1997, pp. 745-748 (John Wiley & Sons, Inc., New York, N.Y.).) Based on a review of literature, high density polyethylene useful in various embodiments of the present application has a reported melting temperature of 104-138° C. Linear high density polyethylene has a reported storage modulus of 800 MPa (about 116.030 psi) at 25° C., slow cooled. (See Mandelkern, et al., "Polyethylene, linear high-density," *Polymer Data Handbook*, 1999, pp. 493-507 (Oxford University Press, Inc., New York, N.Y.).) High density polyethylene has a reported glass transition temperature of −111° C. (See Norman, at al., "Detecting Weak Glass Transition (Tg) in Polymers by HyperDSC," (2009-2011, (PerkinElmer, Inc. Waltham, Mass.).) Examples of high density polyethylene include but are not limited to Alathon® M6020 which is available from Equistar Chemicals LP (Houston, Tex.); Elite™ 5960G, which is available from The Dow Chemical Company (Midland, Mich.); Alathon® L5845, which is available from Lyondell Chemical Company (Houston, Tex.); and Surpass® HPs167-AB (available from NOVA Chemicals Corporation (Calgary, Alberta, Canada).

Second layer 14 of sheet 10 of FIG. 1 comprises a polymer having a glass transition temperature greater than ambient temperature (i.e., about 68-77° F. (about 20-25° C.)).

In some embodiments, the polymer of second layer 14 may comprise polyester, cyclic olefin copolymer, styrenic polymers, or blends of such. As non-limiting examples, second layer 14 may comprise 100% (by weight) polyester or 100% (by weight) styrenic polymer.

Examples of polyester include aromatic polyester and aliphatic polyester. Polyesters have a reported glass transition temperature of 69-115° C. (See, Iroh, "Poly(ethylene terephthalate)," *Polymer Data Handbook*, 1999, pp. 558-560 (Oxford University Press, Inc., New York, N.Y.)) An example of aromatic polyesters includes but is not limited to polyethylene terephthalate (PET) which is processed (as a non-limiting example, via extrusion quench process) to be amorphous or semi-crystalline. Such processed PET includes but is not limited to amorphous polyethylene terephthalate (APET). Examples of APET (i.e., PET which may be processed to be amorphous or semi-crystalline) include but are not limited to Laser+® C 9921, which is available from DAK Americas LLC (Chadds Ford, Pa.); Cleartuf® 8006C, which is available from M&G Polymers USA, LLC (Houston, Tex.); and Preformance™ PET 1708, which is available from StarPet Inc, USA (Asheboro, N.C.). Further examples of aromatic polyesters include but are not limited to glycol-modified polyethylene terephthalate (PETG) and isophthalic acid (IPA)-modified co-polyester (PETI). Examples of PETG include but are not limited to Skygreen® 82008, which is available from SK Chemicals America, Inc. (Irvine Calif.); and Eastar™ Copolyester 6763, which is available from Eastman Chemical Company (Kingsport, Tenn.). An example of PETI includes but is not limited to Auriga PET Type 8383, which is available from Auriga Polymers Inc. (Spartanburg, S.C.). An example of aliphatic polyesters includes but is not limited to polylactic acid (PLA). An example of PLA includes but is not limited to Ingeo™ Biopolymer 4043D, which is available from NatureWorks LLC (Minnetonka, Minn.) and has a reported density of 1.24 g/cc, a reported MFR (210° C./2.16 kg) of 6 g/10 min (in accordance with ASTM D1238), a reported peak melt temperature of 145-160° C. and a reported glass transition temperature of 55-60° C. (in accordance with ASTM D3418). Further examples of polyester include copolyesters. Such copolyesters include but are not limited to Tritan™ copolyesters, which are available from Eastman Chemical Company (Kingsport, Tenn.). An example of a Tritan™ copolyester includes but is not limited to Eastman Tritan™ Copolyester FX100, which is an amorphous copolyester having a reported density of 1.19 g/cc and a reported glass transition temperature of 110° C. (DSC). The polymer of second layer 14 may comprise amorphous or semi-crystalline polyester (APET), glycol-modified polyethylene terephthalate (PETG), isophthalic acid (IPA)-modified co-polyester (PETI), polylactic acid (PLA), copolyesters or blends of such.

Examples of cyclic olefin copolymers include but are not limited to ethylene/norbornene copolymers. An example of ethylene/norbornene copolymer includes but is not limited to TOPAS® 8007, which is available from Topas Advanced Polymers, Inc. (Florence, Ky.) and has a reported density of 1.01 g/cc and a reported glass transition temperature of 78° C. (DSC).

Examples of styrenic polymers include but are not limited to high impact polystyrene (HIPS), general purpose polystyrene (GPPS) and styrene block copolymer (SBC). Styrenic polymers have a reported glass transition temperature of 100° C. (See Pu, "Polystyrene," *Polymer Data Handbook*, 1999, pp. 829-836 (Oxford University Press, Inc., New York, N.Y.).) Examples of HIPS include but are not limited to Polystyrene 825E and Polystyrene 945E, both of which are available from Total Petrochemicals & Refining USA. Inc.); Styrolution PS 6210, which is available from Styrolution America LLD (Aurora, Ill.); and Styron® 487R, which is available from AmSty (The Woodlands, Tex.). GPPS is often called crystal polystyrene or general purpose crystal polystyrene, as a reference to the clarity of the resin. An example of GPPS includes but is not limited to Polystyrene 524B, which is available from Total Petrochemicals & Refining USA. Inc. (Houston, Tex.). Styrene block copolymers (SBC) include styrene butadiene copolymers. A non-limiting example of SBC is KR53 K-Resin® Styrene Butadiene Copolymer, which is available from Chevron Phillips Chemical Company (The Woodlands, Tex.). The polymer of second layer 14 may comprise high impact polystyrene (HIPS), general purpose polystyrene (GPPS), styrene block copolymer (SBC) or blends of such.

First layer 12 and second layer 14 may also comprise processing aids and other additives. Processing aids and other additives include but are not limited to antiblock agents, slip agents, stabilizing agents, release agents, photoinitiators, primers and colorants.

Each of first layer 12 and second layer 14 may be an exterior layer or an interior layer of sheet 10. As a non-limiting example, sheet 10 may further comprise an exterior layer of glycol-modified polyethylene terephthalate or polyethylene adhered, attached or otherwise bonded via an intermediate layer of tie material or otherwise to first layer 12, second layer 14 or both first layer 12 and second layer 14. (Such alternative embodiments are not picture in FIG. 1.)

Sheet 10 has a thickness of equal to or greater than about 10 mil (about 254 micron). In some embodiments, sheet 10 has a thickness of greater than about 15 mil (about 381 micron) or greater than about 20 mil (about 508 micron). In further embodiments, sheet 10 has a thickness of from about 15 mil (about 381 micron) to about 55 mil (about 1397 micron) or from about 20 mil (about 508 micron) to about 50 mil (about 1270 micron) or from about 30 mil (about 762 micron) to about 50 mil (about 1270 micron).

First layer 12 contributes at least about 30% of the thickness of sheet 10 and, as such, is a structural layer for sheet 10. At this contributed thickness, sheet 10 has thermoformability and thermal stability (as each is discussed below). In some embodiments, first layer 12 may contribute from about 30% to about 65% of the thickness of sheet 10.

Second layer 14 contributes at least about 25% but less than about 60% of the thickness of sheet 10 and, as such, is a structural layer for sheet 10. At this contributed thickness, sheet 10 has thermoformability and thermal stability. In some embodiments, second layer 14 may contribute from about 25% to about 55% of the thickness of sheet 10.

Based on the above, first layer 12 comprises different materials than second layer 14. In other words, the composition of first layer 12 is different than the composition of second layer 14. The composition of each layer is not analogous, not identical or not the same. Other various relationships between various properties of the polyolefin of first layer 12 and the polymer of second layer 14 further contribute to the utility of the sheet for thermal stability, thermoformability, and otherwise.

The melting temperature of the polyolefin of first layer 12 is greater than the glass transition temperature of the polymer of second layer 14. The temperature range between the glass transition temperature of the polymer of second layer 14 and the melting temperature of the polyolefin of second layer 14 is believed to provide a temperature range over which sheet 10 is sufficiently supple and deformable for stretching and shaping. Such temperature range may also be referred to as the thermoforming window.

Figure 2:
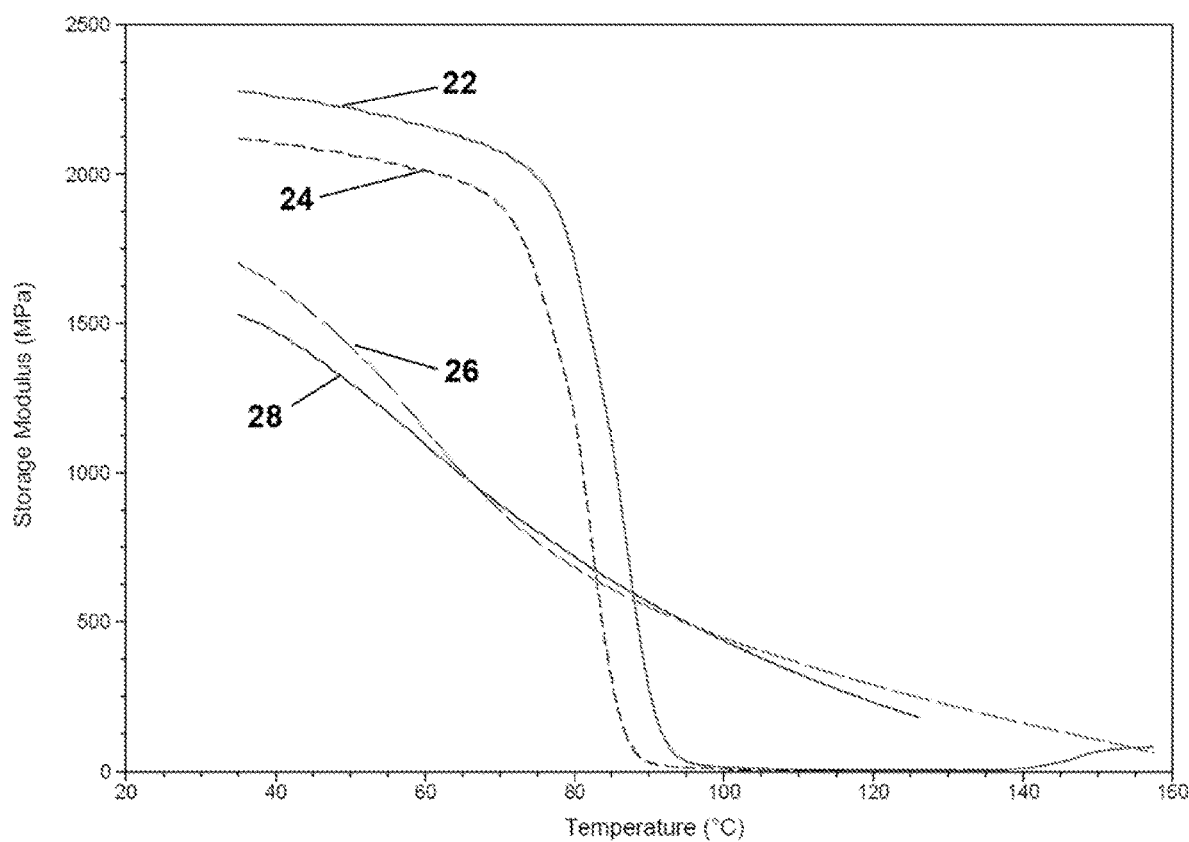
FIG. 2 is a graph depicting the storage modulus (G') temperature sweep of four materials.

The ratio of the storage modulus of the polyolefin of first layer 12 ($G'_1$) at about 35° C. to the storage modulus of the polymer of second layer 14 ($G'_2$) at about 35° C. is less than 1 (i.e., at about 35° C., $G'_1/G'_2 < 1$). As discussed in EXAMPLES—Set 1 below and as shown in FIG. 2, example polyolefins of first layer 12 (e.g., a polypropylene homopolymer (having a storage modulus temperature sweep depicted by line 26) and a medium molecular weight high density polyethylene (having a storage modulus temperature sweep depicted by line 28)) have $G'_1$ at about 35° C. of 1702 MPa and 1528 MPa, respectively, whereas example polymers of second layer 14 (e.g., a polyethylene terephthalate copolymer (having a storage modulus temperature sweep depicted by line 22) and a glycol modified co-polyester (having a storage modulus temperature sweep depicted by line 24)) have $G'_2$ at about 35° C. of 2277 MPa and 2118 MPa, respectively. Each of the resulting four example combinations of $G'_1/G'_2$ at about 35° C. is less than 1.

The ratio of the storage modulus of the polyolefin of first layer 12 ($G'_1$) at the midpoint temperature to the storage modulus of the polymer of second layer 14 ($G'_2$) at the midpoint temperature is greater than 1 (i.e., at midpoint temperature, $G'_1/G'_2 > 1$). As defined above, the midpoint temperature is the average of the glass transition temperature of the polymer of second layer 14 and the melting temperature of the polyolefin of first layer 12. In other words, it is the temperature half-way between the glass transition temperature of the polymer of second layer 14 and the melting temperature of the polyolefin of first layer 12. As discussed in EXAMPLES—Set 1 below and as shown in FIG. 2, upon calculating the midpoint temperature and determining $G'_1$ and $G'_2$ at the midpoint temperature, each of the resulting four example combinations of $G'_1/G'_2$ at the respective midpoint temperatures is greater than 1.

As such, at some temperature between about 35° C. and the midpoint temperature, the storage modulus temperature sweep of the polyolefin of first layer 12 crosses over the storage modulus temperature sweep of the polymer of second layer 14.

Figure 3:
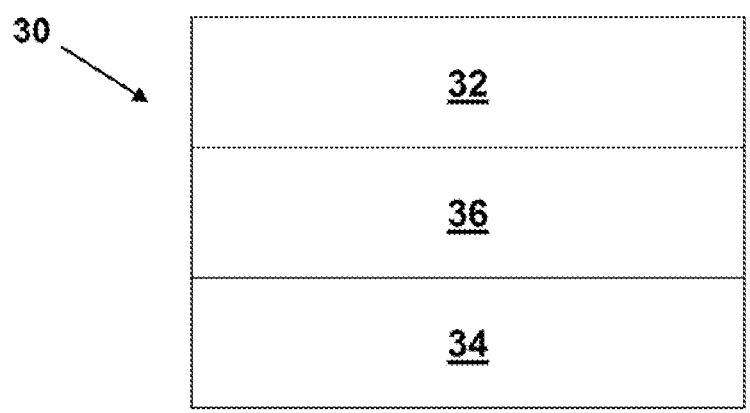
FIG. 3 is a cross-sectional view of a second embodiment of a thermoplastic sheet according to the present application

Returning now to the drawings, FIG. 3 is a cross-sectional view of a second embodiment of a thermoplastic sheet according to the present application. Sheet 30 depicted in FIG. 3 comprises first layer 32, second layer 34 and adhering layer 36 positioned between first layer 32 and second layer 34. First layer 32 is similar to first layer 12 described above and second layer 34 is similar to second layer 14 described above. Adhering layer 36 is any layer or multilayer adhering, attaching or otherwise bonding first layer 32 to second layer 34. In some embodiments, adhering layer comprises an adhesive, an extrudate, a coating (including but not limited to a plasma coating), a tie material or a multilayer film. In some embodiments, adhering layer 36 is a multilayer, blown film. In such embodiments, the multilayer layer may comprise a sealant layer, a barrier layer, tie material or other components known to a person of ordinary skill in the art.

In the embodiments where adhering layer 36 of sheet 30 comprises a multilayer, blown film, sheet 30 may be produced as follows. The multilayer, blown film as adhering layer 36 is first produced on blown film equipment. A non-limiting example of such multilayer, blown film includes a first layer of a blend of ethylene vinyl acetate copolymer and linear low density polyethylene, a second layer of high density polyethylene, a third layer of tie material, a fourth layer of ethylene vinyl-alcohol copolymer, a fifth layer of tie material, a sixth layer of tie material and a seventh layer of polypropylene impact copolymer. Each of the exterior layers of the multilayer blown film (e.g., the first layer of the blend of ethylene vinyl acetate copolymer and linear low density polyethylene and the seventh layer of polypropylene impact copolymer) may be chosen to promote adherence to, for example, second layer 34 and first layer 32, respectively. In producing the multilayer, blown film, one extruder is used for each of the seven layers. (For the first layer comprising the blend of ethylene vinyl acetate copolymer and linear low density polyethylene, the resins for that layer may be pre-blended prior to being added to the extruder.) The layer components are then heated to form streams of melt-plastified polymers and extruded through a die. The coextruded plastified, extruded components then form a tubular extrudate (or bubble). The diameter of the tubular extrudate is expanded by air entering the extrudate at the die. The expanded tubular extrudate is then collapsed by a collapsing frame and flattened through nip rolls. The flattened extrudate is slit open to form two identical multilayer, blown films, each of which is conveyed to separate wind-up reels for furthering process. To such multilayer, blown film (as adhering layer 36), first layer 32 is attached to a first surface of the film (e.g., the exterior layer of polypropylene impact copolymer). Second layer 34 is then attached to the opposing second surface of the film (e.g., the exterior layer of the blend of ethylene vinyl acetate copolymer and linear low density polyethylene). First layer 32 and second layer 34 may be attached by various methods known in the art. These methods include but are not limited to thermal lamination, adhesive lamination (including solvent and solvent-less lamination), extrusion lamination, extrusion coating and photolytic lamination. The parameters for such lamination or coating may be set by one skilled in the art without undue experimentation.

The various embodiments of the sheet (e.g., sheet 10, 30) described in the present application may exhibit various properties, as shown and further defined and described in the examples. For example, the sheet may have a normalized combined tear initiation and propagation resistance in both the machine direction and the transverse direction or greater than about 0.115 in*lbf/mil (0.0511 Ncm/micron) energy to break and an elongation greater than about 0.800%/mil (0.0315%/micron) as measured in accordance with ASTM D1004. The sheet may also have between 0 and about 20 degrees of transverse direction (TD) curl. Curl less than or equal to about 20 degrees is generally acceptable, as this amount of TD curl causes minimal (if any) problems in further processing, including but not limited to subsequent thermoforming of the sheet. Curl greater than about 20 degrees is generally unacceptable, as this amount of TD curl causes problems in further processing.

As noted, the sheet described in the various embodiments of the present application may be thermoformable, in that it may be formed or thermoformed into a package, such as cups, trays, plates or other containers, with even material distribution. A description of "thermoformable" is provided above. Furthermore, thermoforming and other similar techniques are well known in the art for packaging. (See Throne, "Thermoforming," Encyclopedia of Polymer Science and Technology, Third Edition, 2003, Volume 8, pp. 222-251 (John Wiley & Sons, Inc., Hoboken, N.J.); see also Irwin, "Thermoforming," Modern Plastics Encyclopedia, 1984-1985, pp. 329-336 (McGraw-Hill. Inc., New York, N.Y.); see also "Thermoforming," The Wiley Encyclopedia of Packaging Technology, Second Edition, 1997, pp. 914-921 (John Wiley & Sons. Inc., New York, N.Y.).) Suitable thermoforming methods include standard, deep-draw or plug-assist vacuum forming. During standard vacuum forming, a thermoplastic web, such as the sheet described in the present application, is heated and a vacuum is applied beneath the web allowing atmospheric pressure to force the web into a preformed mold. When relatively deep molds are employed, the process is referred to as a "deep-draw" application. In a plug-assist vacuum forming method, after the thermoplastic web has been heated and sealed across a mold cavity, a plug shape similar to the mold shape impinges on the thermoplastic web and, upon the application of vacuum, the thermoplastic web conforms to the mold surface.

A thermoformed package formed from a sheet having a first layer comprising different materials (i.e., having a different composition) than a second layer (e.g., a package formed from sheet 10, 30 comprising first layer 12, 32 and second layer 14, 34) may exhibit a compression strength (or "top load compression") that is greater than about 125% of a compression strength of an other package formed from an other sheet having an other first layer comprising the same polyolefin (e.g., polypropylene) and having an analogous composition as an other second layer, where the other first layer still contributes at least about 30% of the thickness of the other sheet and the other second layer still contributes at least about 25% but less than about 60% of the thickness of the other sheet. In some embodiments, such compression strength may be greater than about 150% or greater than about 200% or greater than about 300% or from about 150% to about 300% of the compression strength of the other package. Packages with higher compression strength may better withstand forces encountered in filling and transit.

In some embodiments, the thermoformed package comprising the sheet described in the present application may be thermoformed and filled on separate production lines. In other embodiments, such thermoformed package may be thermoformed and filled on the same production line, such as a form-fill-seal (FFS) machine.

The sheet described in the present application may be thermally stable. As described above, a thermally stable sheet maintains dimensionality and shape and does not distort or deform when exposed to temperatures from about 194° F. (about 90° C.) to about 284° F. (about 140° C.). As such, the sheet in the various embodiments of the present application may form a package for various heat processes, including but not limited to retort, aseptic, hot-fill or microwave processing.

Examples—Set 1

To further exemplify the various embodiments of the present application, storage modulus (G') of various materials was determined via dynamic mechanical analysis (DMA) using a Q800 Dynamic Mechanical Analyzer available from TA Instruments (New Castle, Del.)). Multi-Frequency (Strain) mode was used to apply a sinusoidal stress (or strain) to a material and to measure the resultant sinusoidal strain (or stress).

The Dynamic Mechanical Analyzer was first equilibrated at 35.00° C. The temperature was held constant (isothermal) for 5.00 min. The temperature was then increased 3.00° C. per minute up to 160.00° C. to obtain a storage modulus (G') temperature sweep. FIG. 2 is a graph depicting the storage modulus (G') temperature sweep of four materials. Line 22 of FIG. 2 depicts the storage modulus (G') temperature sweep for Laser+® C 9921, a polyethylene terephthalate copolymer available from DAK Americas LLC (Chadds Ford, Pa.), having a reported intrinsic viscosity of 0.80+ 0.02, a reported density of 1.32 g/cc, a reported melting point of 238-243° C. and a reported glass transition temperature of 78.0° C. (For this example, Laser+® C9921 was processed via the extrusion quench process to be semicrystalline and, as such, was considered as APET.) Line 24 of FIG. 2 depicts the storage modulus (G') temperature sweep for Skygreen® S2008, a glycol modified co-polyester (i.e., a PETG) available from SK Chemicals America. Inc. (Irvine, Calif.), having a reported specific gravity of 1.27 and a reported glass transition temperature of 80° C. Line 26 of FIG. 2 depicts the storage modulus (G') temperature sweep for Polypropylene H110-02NZ, a polypropylene homopolymer available from Braskem (Philadelphia, Pa.), having a reported density of 0.900 g/cc, a reported melt index (230° C./2.16 kg) of 2.0 g/10 min (in accordance with ASTM D1238) and a reported melting temperature of 161° C. Line 28 of FIG. 2 depicts the storage modulus (G') temperature sweep for Alathon® L5845, a medium molecular weight high density polyethylene available from Lyondell Chemical Company (Houston, Tex.), having a reported density of 0.958 g/cc, a reported melt index of 0.45 g/10 min (in accordance with ASTM D1238) and a reported melting point of 104-138° C. (average melting point of 121° C.).

Laser+® C 9921 and Skygreen® S2008 are examples of the polymer of the second layer of the sheet described in the present application. Polypropylene H110-02NZ and Alathon® L5845 are examples of the polyolefin of the first layer of the sheet described in the present application. As non-limiting examples (Examples 1-4), based on these materials, the sheet described in the present application may comprise a first layer and a second layer comprising the materials as in TABLE 1.

TABLE 1

| | First Layer | Second Layer | Glass Transition Temperature (° C.) (Second Layer) | Melting Point Temperature (° C.)(First Layer) | Midpoint Temperature (° C.) |
|---|---|---|---|---|---|
| Example 1 | Polypropylene H110-02NZ | Laser+® C 9921 | 78.0 | 161 | 120 |
| Example 2 | Polypropylene H110-02NZ | Skygreen® S2008 | 80 | 161 | 121 |
| Example 3 | Alathon® L5845 | Laser+® C 9921 | 78.0 | 121 | 100 |
| Example 4 | Alathon® L5845 | Skygreen® S2008 | 80 | 121 | 101 |

(The "midpoint temperature" refers to the temperature halfway between the glass transition temperature of the polymer of the second layer and the melting temperature of the polyolefin of the first layer.) TABLE 2 summarizes data obtained from FIG. 2, based on the sheets of Examples 1-4.

TABLE 2

| | G' (MPa) at 35° C. | G' (MPa) at 100° C. | G' (MPa) at 101° C. | G' (MPa) at 120° C. | G' (MPa) at 121° C. |
|---|---|---|---|---|---|
| Laser+® C 9921 | 2277 | 14.06 | na | 4.797 | na |
| Skygreen® S2008 | 2118 | na | 6.360 | na | 0 |
| Polypropylene H110-02NZ | 1702 | na | na | 288.6 | 281.9 |
| Alathon® L5845 | 1528 | 436.4 | 424.4 | na | na |

(A data point is listed as "na" ("not applicable") if the G' at that temperature is not relevant for Examples 1-4. For example, Laser+® C 9921 as a second layer material when combined with either Polypropylene H110-02NZ or Alathon® L5845 as a first layer material has a midpoint temperature of 120° C. or 100° C., respectively. Therefore, the G' at the other temperatures is not relevant for Examples 1-4.) Based on the above, at about 35° C., the ratio of $G'_1$ (storage modulus of first layer material)/$G'_2$ (storage modulus of second layer material) is less than 1; and at the midpoint temperature, the ratio of $G'_1/G'_2$ is greater than 1. These relationships are shown in TABLE 3.

TABLE 3

| | First Layer | Second Layer | $G'_1/G'_2$ at 35° C. | $G'_1/G'_2$ at Midpoint Temperature |
|---|---|---|---|---|
| Example 1 | Polypropylene H110-02NZ | Laser+® C 9921 | 0.7475 | 60.16 |
| Example 2 | Polypropylene H110-02NZ | Skygreen® S2008 | 0.8036 | ∞ |
| Example 3 | Alathon® L5845 | Laser+® C 9921 | 0.6711 | 31.04 |
| Example 4 | Alathon® L5845 | Skygreen® S2008 | 0.7214 | |

Examples—Set 2

To still further exemplify the various embodiments of the present application, several example and comparative example sheets were produced and evaluated for various properties. The materials included in the various example and comparative example sheets are as follows.

ADD is processing aids and other additives. The uses of processing aids and other additives varies depending on the equipment, materials, desired aesthetics, etc. Processing aids and other additives include but are not limited to antiblock agents, slip agents, stabilizing agents, release agents, photoinitiators, primers and colorants. Such aids are known to a person of ordinary skill in the art, and their use may be determined without undue experimentation EVA1 is an ethylene vinyl acetate copolymer having a vinyl acetate content of about 26-28% by weight (of total EVA composition). A non-limiting example of EVA1 is Escorene™ Ultra LD 768.MJ (available from ExxonMobil Chemical Company (Houston, Tex.)), having a reported vinyl acetate content of 26.2% by weight (of total EVA composition), a reported density of 0.914 g/cc and a reported melt index (190° C./2.16 kg) of 2.3 g/10 min (in accordance with ASTM D1238). A further non-limiting example of EVA1 is Ateva® 2861A (available from Celanese (Irving, Tex.)), having a reported vinyl acetate content of 28% by weight (of total EVA composition), a reported density of 0.949 g/cc and a reported melt index (190° C./2.16 kg) of 6.0 g/10 min (in accordance with ASTM D1238).

EVA2 is an ethylene vinyl acetate copolymer having a vinyl acetate content of about 18-18.5% by weight (of total EVA composition). A non-limiting example of EVA2 is Escorene™ Ultra LD 721.IK (available from ExxonMobil Chemical Company (Houston, Tex.)), having a reported vinyl acetate content of 18.5% by weight (of total EVA composition), a reported density of 0.942 g/cc and a reported melt index (190° C./2.16 kg) of 2.5 g/10 min (in accordance with ASTM D1238). A further non-limiting example of EVA2 is DuPont™ Elvax®3170 (available from E.I. du Pont de Nemours and Company, Inc. (Wilmington, Del.)), having a reported vinyl acetate content of 18% by weight (of total EVA composition), a reported density of 0.94 g/cc and a reported flow rate (190° C./2.16 kg) of 2.5 g/10 min (in accordance with ASTM D1238).

EVOH1 is an ethylene vinyl-alcohol copolymer. A non-limiting example of EVOH1 is EVAL™ L171B (available from Kuraray America Inc. (Houston, Tex.)), having a reported ethylene content of 27 mole percent, a reported density of 1.20 g/cc and a reported melting temperature of 191° C.

GPPS1 is a general purpose crystal polystyrene. A non-limiting example of GPPS1 is Polystyrene 524B (available from Total Petrochemicals & Refining USA, Inc. (Houston, Tex.)), having a reported density of 1.04 g/cc and a reported melt flow (200° C./5 kg) of 9.0 g/10 min (in accordance with ASTM D1238).

HDPE1 is a high-moisture-barrier high density polyethylene. A non-limiting example of HDPE1 is Surpass® HPs167-AB (available from NOVA Chemicals Corporation (Calgary, Alberta, Canada)), having a reported density of 0.966 g/cc and a reported melt flow (190° C./2.16 kg) of 1.2 g/10 min (in accordance with ASTM D1238).

HDPE2 is a medium molecular weight high density polyethylene. A non-limiting example of HDPE2 is Alathon® L5845 (available from Lyondell Chemical Company (Houston, Tex.)), having a reported density of 0.958 g/cc, a reported melt index of 0.45 g/10 min (in accordance with ASTM D1238) and a reported melting point of 104-138° C. Further non-limiting examples of HDPE2 are Elite™ 5960G (available from The Dow Chemical Company (Midland, Mich.)), having a reported density of 0.962 g/cc, a reported melt index (190° C./2.16 kg) of 0.85 g/10 min (in accordance with ASTM D1238) and a reported melting temperature of 134° C. and Alathon® M6020 (available from Equistar Chemicals, LP (Houston, Tex.)), having a reported density of 0.960 g/cc, a reported melt index of 2.0 g/10 min (in accordance with ASTM D1238), and a reported melting point of 104-138° C.

HIPS1 is a high impact polystyrene. A non-limiting example of HIPS1 is Polystyrene 825E (available from Total Petrochemicals & Refining USA, Inc. (Houston, Tex.)), having a reported density of 1.04 g/cc and a reported melt flow (200° C./5 kg) of 3.0 g/10 min (in accordance with ASTM D1238). Further non-limiting examples of HIPS1 are Polystyrene 945E (available from Total Petrochemicals & Refining USA. Inc. (Houston, Tex.)), having a reported density of 1.04 g/cc and a reported melt flow (200° C./5 kg) of 3.5 g/10 min (in accordance with ASTM D1238), Styrolution PS 6210 (available from Styrolution America LLC (Aurora, Ill.)), having a reported density of 1.04 g/cc and a reported melt flow rate (200° C./5 kg) of 2.9 g/10 min (in accordance with ASTM D1238) and Styron® 487R (available from AmSty (The Woodlands, Tex.)), having a reported specific gravity of 1.04 and a reported melt flow index (200° C./5 kg) of 2.8 g/10 min (in accordance with ASTM D1238).

LLDPE1 is a liner low density polyethylene. A non-limiting example of LLDPE1 is LLDPE LL 1001.32 (available from ExxonMobil Chemical Company (Houston, Tex.)), having a reported density of 0.918 g/cc and a reported melt index (190° C./2.16 kg) of 1.0 g/10 min (in accordance with ASTM D1238). A further non-limiting example of LLDPE 1 is LLDPE LL 1002.YB (available from ExxonMobil Chemical Company (Houston, Tex.)), having a reported density of 0.918 g/cc and a reported melt index (190° C./2.16 kg) of 2.0 g/10 min (in accordance with ASTM D1238).

LLDPE2 is an anhydride-modified, linear low density polyethylene. A non-limiting example of LLDPE2 is Bynel® 4164 (available from E.I. du Pont de Nemours and Company, Inc. (Wilmington, Del.)), having a reported density of 0.93 g/cc and a reported melt flow rate (190° C./2.16 kg) of 1.2 g/10 min (in accordance with ASTM D1238).

LLDPE3 is an anhydride-modified, linear low density polyethylene tie resin concentrate. A non-limiting example of LLDPE3 is Bynel® 41E710 (available from E.I. du Pont de Nemours and Company, Inc. (Wilmington, Del.)), having a reported density of 0.91 g/cc and a reported melt flow rate (190° C./2.16 kg) of 2.7 g/10 min (in accordance with ASTM D1238).

PET1 is a polyethylene terephthalate copolymer. A non-limiting example of PET1 is Laser+® C 9921 (available from DAK Americas LLC (Chadds Ford, Pa.)), having a reported intrinsic viscosity of 0.80±0.02, a reported density of 1.32 g/cc, a reported melting point of 238-243° C. and a reported glass transition temperature of 78.0° C. Further non-limiting examples of PET1 are Cleartuf® 8006C (available from M&G Polymers USA, LLC (Houston, Tex.)), having a reported intrinsic viscosity of 0.80±0.02 dl/g and a reported melting point of from 248-253° C. and Preformance™ PET 1708 (available from StarPet Inc, USA (Asheboro, N.C.)), having a reported intrinsic viscosity of 0.80±0.02 dl/g.

PETG1 is a glycol modified co-polyester. A non-limiting example of PETG1 is Skygreen® S2008 (available from SK Chemicals America, Inc. (Irvine, Calif.)), having a reported specific gravity of 1.27 and a reported glass transition temperature of 80° C. (DSC). A further non-limiting example of PETG1 is Eastar™ Copolyester 6763 (available from Eastman Chemical Company (Kingsport, Tenn.)), having a reported density of 1.27 g/cc and a reported glass transition temperature of 80-81° C.

PETI1 is an isophthalic acid (IPA) modified co-polyester. A non-limiting example of PETI1 is Auriga PET Type 8393 (available from Auriga Polymers Inc. (Spartanburg, S.C.), having a reported IPA content of about 33 weight percent, a reported density of 1.32 g/cc and a reported glass transition temperature of 70.05° C. (DSC).

PP1 is a polypropylene impact copolymer. A non-limiting example of PP1 is Polypropylene 4170 (available from Total Petrochemicals & Refining USA, Inc. (Houston, Tex.)), having a reported density of 0.905 g/cc and a reported melt flow (230° C.) of 0.75 g/10 min (in accordance with ASTM D1238). A further non-limiting example of PP1 is Polypropylene 4481WZ (available from Total Petrochemicals & Refining USA, Inc. (Houston, Tex.)), having a reported density of 0.905 g/cc, a reported melt flow (230° C.) of 4.0 g/10 min (in accordance with ASTM D1238), a reported melting point of 160-165° C. and a reported glass transition temperature of −60° C.

PP2 is a polypropylene homopolymer. A non-limiting example of PP2 is Inspire® 6021N (available from Braskem (Philadelphia, Pa.)), having a reported nominal melt flow rate (230° C./2.16 kg) of 2 g/10 min (in accordance with ASTM D1238) and a reported melting point of 160-170° C. Further non-limiting examples of PP2 are Polypropylene Lumicene® M3382MZ (available from Total Petrochemicals & Refining USA, Inc. (Houston, Tex.)), having a reported density of 0.905 g/cc, a reported melt flow of 3.5 g/10 min (in accordance with ASTM D1238, Condition "L"), a reported melting point of 153° C. and a reported glass transition temperature of −5° C. and Polypropylene H110-02NZ (available from Braskem (Philadelphia, Pa.)), having a reported density of 0.900 g/cc, a reported melt index (230° C./2.16 kg) of 2.0 g/10 min (in accordance with ASTM D1238) and a reported melting temperature of 161° C.

PP3 is a polypropylene random copolymer. A non-limiting example of PP3 is Polypropylene RP650 (available from Braskem (Philadelphia, Pa.)), having a reported nominal melt flow rate (230° C./2.16 kg) of 2 g/10 min (in accordance with ASTM D1238) and a reported melting point of 140-170° C. A further non-limiting example of PP3 is Polypropylene 6281KZ (available from Total Petrochemicals & Refining USA, Inc. (Houston, Tex.)), having a reported density of 0.900 g/cc, a reported melt flow of 1.7 g/10 min (in accordance with ASTM D1238, Condition "L") and a reported melting point of 147° C.

SBC1 is a styrene-butadiene copolymer. A non-limiting example of SBC1 is KR53 K-Resin® Styrene Butadiene Copolymer (available from Chevron Phillips Chemical Company LP (The Woodlands, Tex.), having a reported specific gravity of 1.02 g/cc and a reported melt flow rate (200° C./5.0 kg) of 10.0 g/10 min (in accordance with ASTM D1238).

TIE1 is a modified polyolefin with functional groups for bonding. A non-limiting example of TIE1 is Admer™ QF500A (available from Mitsui Chemicals America, Inc. (Rye Brook, N.Y.), having a reported density of 0.900 g/cc and a reported melt flow rate (230° C.) of 3.0 g/10 min (in accordance with ASTM D1238).

ULDPE1 is an ultra low (or very low) density polyethylene. A non-limiting example of ULDPE1 is Attane™ NG 4701G (available from The Dow Chemical Company (Midland, Mich.)), having a reported density of 0.912 g/cc and a reported melt index (190° C./2.16 kg) of 0.80 g/10 min (in accordance with ASTM D1238). A further non-limiting example of ULDPE1 is Surpass® FPs016A (available from NOVA Chemicals Corporation (Calgary, Alberta, Canada)), reported density of 0.916 g/cc and a reported index (190° C./2.16 kg) of 0.65 g/10 min (in accordance with ASTM D1238).

Table 4 lists the structure and composition for Examples 5-12. Table 5 lists the structure and composition for Comparative Examples 1-4.

TABLE 4

| mil (micron) | % thickness (total structure) | layer composition (% by weight) |
|---|---|---|
| Example 5 | | |
| 24 mil (610 micron) | 59.6% | 100% PET1 |
| 4.25 mil (108 micron) | 10.6% | 60% EVA1 + 35% LLDPE1 + 5% ADD 100% HDPE1 100% LLDPE2 100% EVOH1 100% LLDPE2 90% ULDPE1 + 10% LLDPE3 100% PP1 |
| 12 mil (305 micron) | 29.8% | 56% PP2 + 38% HDPE2 + 6% ADD |
| Example 6 | | |
| 11 mil (279 micron) | 28.8% | 100% PET 1 |
| 4.25 mil (108 micron) | 11.1% | 60% EVA1 + 35% LLDPE 1 + 5% ADD 100% HDPE1 100% LLDPE2 100% EVOH1 100% LLDPE2 90% ULDPE1 + 10% LLDPE3 100% PP1 |
| 23 mil (584 micron) | 60.1% | 70% PP2 + 30% PP3 |
| Example 7 | | |
| 14 mil (356 micron) | 36.6% | 100% PET 1 |
| 4.25 mil (108 micron) | 11.1% | 60% EVA1 + 35% LLDPE 1 + 5% ADD 100% HDPE1 100% LLDPE2 100% EVOH1 100% LLDPE2 90% ULDPE1 + 10% LLDPE3 100% PP1 |
| 20 mil (508 micron) | 52.3% | 70% PP2 + 30% PP3 |
| Example 8 | | |
| 17 mil (432 micron) | 44.45% | 100% PET 1 |
| 4.25 mil (108 micron) | 11.1% | 60% EVA1 + 35% LLDPE 1 + 5% ADD 100% HDPE1 100% LLDPE2 100% EVOH1 100% LLDPE2 90% ULOPE1 + 10% LLDPE3 100% PP1 |
| 17 mil (432 micron) | 44.45% | 70% PP2 + 30% PP3 |
| Example 9 | | |
| 20 mil (508 micron) | 52.3% | 100% PET 1 |
| 4.25 mil (108 micron) | 11.1% | 60% EVA1 + 35% LLDPE 1 + 5% ADD 100% HDPE1 100% LLDPE2 100% EVOH1 100% LLDPE2 90% ULDPE1 + 10% LLDPE3 100% PP1 |
| 14 mil (356 micron) | 36.6% | 70% PP2 + 30% PP3 |
| Example 10 | | |
| 25 mil (635 micron) | 50.0% | 100% PETG1 |
| 5.0 mil (127 micron) | 10.0% | 60% EVA1 + 35% LLDPE 1 + 5% ADD 100% HDPE1 100% LLDPE2 100% EVOH1 100% LLDPE2 90% ULDPE1 + 10% LLDPE3 100% PP1 |
| 20 mil (508 micron) | 40.0% | 80% PP2 + 20% PP3 |
| Example 11 | | |
| 25 mil (635 micron) | 50.0% | 100% PETI |
| 5.0 mil (127 micron) | 10.0% | 60% EVA1 + 35% LLDPE 1 + 5% ADD 100% HDPE1 100% LLDPE2 100% EVOH1 100% LLDPE2 90% ULDPE1 + 10% LLDPE3 100% PP1 |
| 20 mil (508 micron) | 40.0% | 80% PP2 + 20% PP3 |
| Example 12 | | |
| 20 mil (508 micron) | 50.31% | 100% HIPS1 |
| 4.75 mil (121 micron) | 11.95% | 93% SBC1 + 6% HIPS1 + 1% ADD 100% LLDPE2 100% HDPE1 100% HDPE1 100% LLDPE2 100% EVOH1 100% LLDPE2 90% ULDPE1 + 10% LLDPE3 100% PP1 |
| 15 mil (381 micron) | 37.74% | 56% PP2 + 38% HDPE2 + 6% ADD |

TABLE 5

| mil (micron) | % thickness (total structure) | layer compositon (% by weight) |
|---|---|---|
| Comparative Example 1 | | |
| 22.5 mil (572 micron) | 45.0% | 78% PP2 + 20% PP3 + 2% ADD |
| 5.0 mil (127 micron) | 10.0% | 100% PP1 |
| | | 90% ULDPE1 + 10% LLDPE3 |
| | | 100% LLDPE2 |
| | | 100% EVOH1 |
| | | 100% LLDPE2 |
| | | 100% HDPE1 |
| | | 100% EVA2 |
| | | 100% HDPE1 |
| | | 100% LLDPE2 |
| | | 100% EVOH1 |
| | | 100% LLDPE2 |
| | | 90% ULDPE1 + 10% LLDPE3 |
| | | 100% PP1 |
| 22.5 mil (572 micron) | 45.0% | 78% PP2 + 20% PP3 + 2% ADD |
| Comparative Example 2 | | |
| 19 mil (483 micron) | 46.9% | 56% PP2 + 38% HDPE2 + 6% ADD |
| 2.5 mil (64 micron) | 6.2% | 100% TIE1 |
| | | 100% EVOH1 |
| | | 100% TIE1 |
| 1.9 mil (483 micron) | 46.9% | 56% PP2 + 38% HDPE2 + 6% ADD |
| Comparative Example 3 | | |
| 23 mil (584 micron) | 60.1% | 100% PET 1 |
| 4.25 mil (1.08 micron) | 11.1% | 60% EVA1 + 35% LLDPE1 + 5% ADD |
| | | 100% HDPE1 |
| | | 100% LLDPE2 |
| | | 100% EVOH1 |
| | | 100% LLDPE2 |
| | | 90% UDLPE + 10% LLDPE3 |
| | | 100% PP1 |
| 11 mil (279 micron) | 28.8% | 70% PP2 + 30% PP3 |
| Comparative Example 4 | | |
| 26 mil (660 micron) | 68.0% | 100% PET 1 |
| 4.25 mil (108 micron) | 11.1% | 60% EVA1 + 35% LLDPE1 + 5% ADD |
| | | 100% HDPE1 |
| | | 100% LLDPE2 |
| | | 100% EVOH1 |
| | | 100% LLDPE2 |
| | | 90% UDLPE + 10% LLDPE3 |
| | | 100% PP1 |
| 8 mil (203 micron) | 20.9% | 70% PP2 + 30% PP3 |

(Note:
The thickness listed were target thicknesses. In practice, for this present application, due to manufacturing variation, the total thickness of a sheet may have varied ±5%. For example, the structure of Example 5 (listed as having a total thickness of 40.25 mil (about 1023 micron)) may have had a total thickness of from about 38.2 mil (about 970 micron) to about 42.3 mil (about 1074 micron). The structure of Comparative Example 2 (listed as having a total thickness of 40.5 mil (about 1030 micron) may had had a total thickness of from about 38.5 mil (about 978 micron) to about 42.5 mil (about 1080 micron). Additionally, 29.8% (the thickness of the polypropylene homopolymer/high density polyethylene blend layer of Example 5) is an example of about 30%; however, 28.8% (the thickness of the polypropylene homopolymer/polypropylene random copolymer blend layer of Comparative Example 3) is not an example of about 30%. Also, 60.1% (the thickness of the polyethylene terephthalate copolymer of Comparative Example 3 is an example of about 60% or greater and is not an example of less than about 60%. Example 5 is a non-limiting example of a sheet where the polyolefin of the first layer comprises from about 50% (by weight) to about 70% (by weight) polypropylene homopolymer and from about 30% (by weight) to about 50% (by weight) high density polyethylene and the polymer of the second layer comprises amorphous or semi-crystalline polyester (APET).)

(Note: The thickness listed were target thicknesses. In practice, for this present application, due to manufacturing variation, the total thickness of a sheet may have varied ±5%. For example, the structure of Example 5 (listed as having a total thickness of 40.25 mil (about 1023 micron)) may have had a total thickness of from about 38.2 mil (about 970 micron) to about 42.3 mil (about 1074 micron). The structure of Comparative Example 2 (listed as having a total thickness of 40.5 mil (about 1030 micron) may had had a total thickness of from about 38.5 mil (about 978 micron) to about 42.5 mil (about 1080 micron). Additionally, 29.8% (the thickness of the polypropylene homopolymer/high density polyethylene blend layer of Example 5) is an example of about 30%; however, 28.8% (the thickness of the polypropylene homopolymer/polypropylene random copolymer blend layer of Comparative Example 3) is not an example of about 30%. Also, 60.1% (the thickness of the polyethylene terephthalate copolymer of Comparative Example 3 is an example of about 60% or greater and is not an example of less than about 60%. Example 5 is a non-limiting example of a sheet where the polyolefin of the first layer comprises from about 50% (by weight) to about 70% (by weight) polypropylene homopolymer and from about 30% (by weight) to about 50% (by weight) high density polyethylene and the polymer of the second layer comprises amorphous or semi-crystalline polyester (APET).)

The Examples and Comparative Examples were tested for various properties including combined tear initiation and propagation resistance, curl, top load compression, material distribution in thermoforming and retort recovery.

Combined Tear Initiation and Propagation Resistance is a measure of the torque required to both initiate and propagate (or continue) a tear in a plastic film or sheet. To determine this force, both energy to break and elongation are determined in both the machine direction and the transverse (or cross) direction of the sheet. Energy to break is expressed in in*lbf (or "inch pounds" or "pounds inch") or Ncm (where 1 in*lbf=11.2985 Ncm) and elongation is expressed as a percentage. Both are measured in accordance with ASTM D1004, "Standard Test Method for Tear Resistance (Graves Tear) of Plastic Film and Sheeting." For this application, both measurements were normalized as per one mil (or one micron (where 1 mil=25.4 micron)) of sheet thickness. As shown in TABLE 6, Example 5 had a normalized combined tear initiation and propagation resistance in both the machine direction and the transverse direction of greater than about 0.115 in*lbf/mil (0.0511 Ncm/micron) energy to break and an elongation in both the machine direction and the transverse direction of greater than about 0.800%/mil (0.0315%/micron), as measured in accordance with ASTM D1004. The normalized combined tear initiation and propagation resistance in both the machine direction and the transverse direction was from about 0.95 in*lbf/mil (0.423 Ncm/micron) to about 1.10 in*lbf/mil (0.489 Ncm/micron) energy to break and elongation in both the machine direction and the transverse direction was from about 1.30%/mil (0.051%/micron) to about 1.55%/mil (0.061%/micron), as measured in accordance with ASTM D1004.

TABLE 6

| | Machine Direction | | Transverse Direction | |
|---|---|---|---|---|
| | Energy to Break in*lbf/mil (Ncm/micron) | Elongation %/mil (%/micron) | Energy to Break in*lbf/mil (Ncm/micron) | Elongation %/mil (%/micron) |
| Example 5 | 0.96 (0.427) (average of 8 samples) | 1.33 (0.0523) (average of 8 samples) | 1.07 (0.476) (average of 7 samples) | 1.52 (0.0598) (average of 7 samples) |

Figure 4:
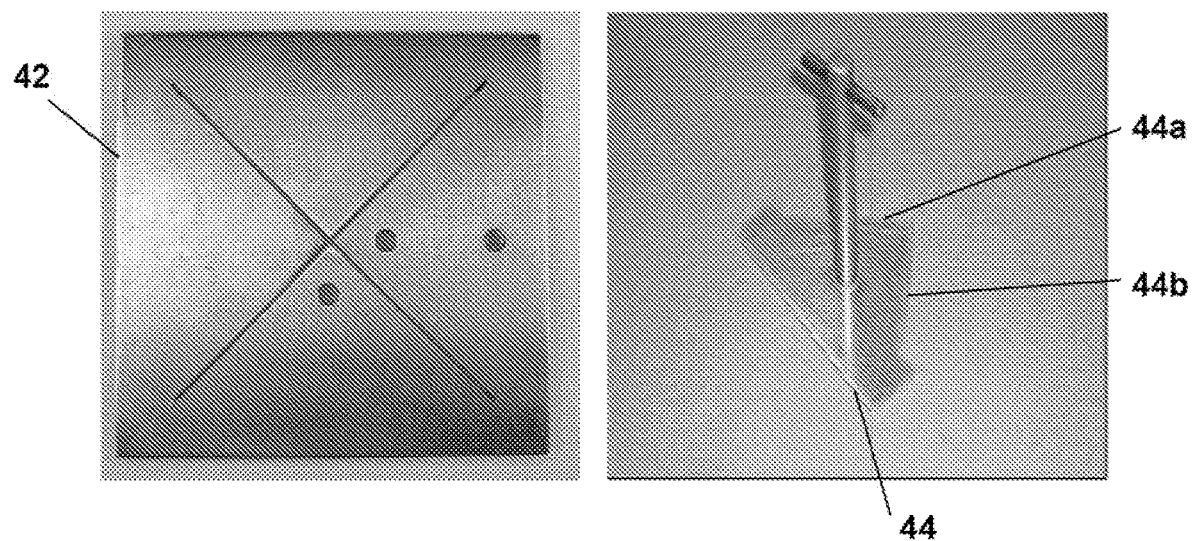
FIG. 4 is a picture depicting two example cutting templates for use in the curl test method.
Figure 5:
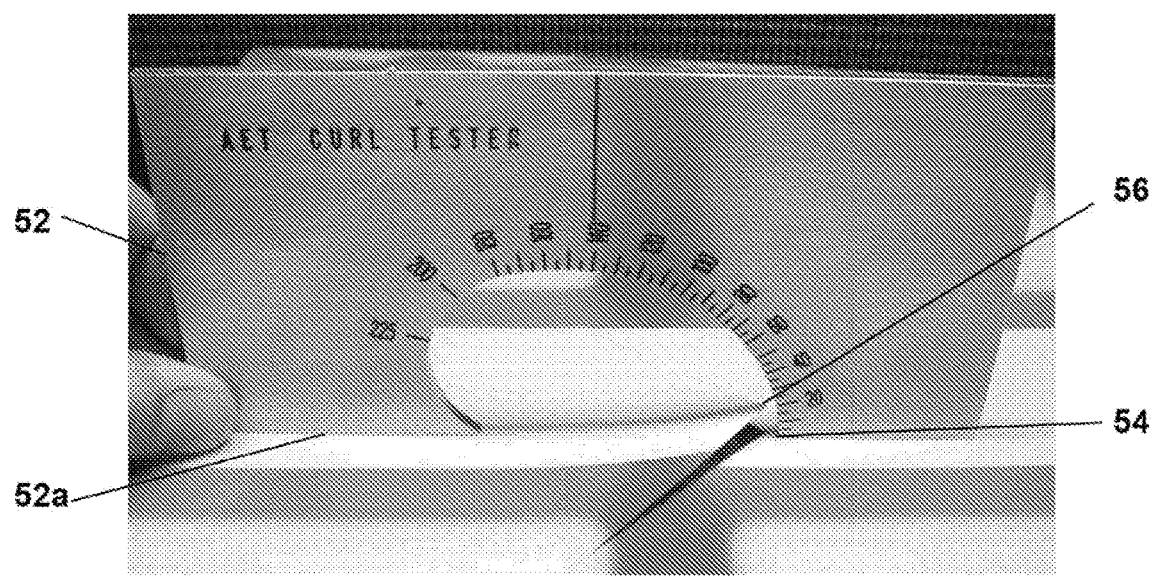
FIG. 5 is a picture depicting a curl tester placed on a prepared, cut sample to determine the degree of curl.

Curl is a measure of the amount of curl in a film or sheet sample. It is expressed in degrees and is measured in accordance with the following test method: A sample is placed, sealant side up (if applicable) on a clean, flat cutting surface. A cutting template may then be placed in the center of a lane or in the center of the sample, with one edge of the template parallel to the edge of sample. FIG. 4 is a picture depicting two example cutting templates for use in this curl test method. Template 42 is a slit template. Template 44 is a corner template. If Template 42 is used, an "X" is cut in the sample using the two slits in Template 42. If Template 44 is used, a corner in both the machine direction and the transverse direction is cut using side edges 44a and 44b of Template 44. If no template is available, two-inch cuts are made along the edge of the curl tester used. A non-limiting example of a curl tester is the AET Curl Tester, available from Taghleef Industries Inc. (Wilmington, Del.) (formerly known as Applied Extrusion Technologies, Inc. (AET Films)). After making the cuts, the cutting template is removed from the sample. If a portion of the sample does not rise (i.e., curl) from the cutting surface, the sample is turned over, and the above sample placement and cutting are repeated. The sample is then allowed to sit for one minute. The point having the largest amount of rise (or curl) is visually determined and the curt at this point is measured using the curl tester. The curl tester is placed on its edge in the direction to be tested with the 0° on the curl scale placed about 0.0625 inch (1.59 millimeters) from the tip of the removed (i.e., "cut out") point opposite the curled (or risen) point to be measured. FIG. 5 is a picture depicting a curl tester placed on a prepared, cut sample to determine the degree of curl. Curl tester 52 is placed on its edge 52a, such that "zero point" 54 (i.e., the 0° on the curl scale) is about 0.0625 inch (1.59 millimeters) the "cut-out" opposite measured point 56. The amount of curl is determined by where the point to be measured is pointing on the curl scale of the curl tester. In FIG. 5, the degree of curl for the sample used in the test method is approximately 20 degrees.

As shown in TABLE 7, the amount of curl in the transverse direction (TD) for Example 5 (with a first layer of a blend of polypropylene homopolymer and high density polyethylene and a second layer of polyethylene terephthalate copolymer) was determined to be about 0 degrees, while the amount of curl in the TD for Comparative Example 1 (with a first layer of a blend of polypropylene homopolymer and polypropylene random copolymer and a second layer of a blend of polypropylene homopolymer and polypropylene random copolymer) was determined to be about 55 degrees.

TABLE 7

|  | Transverse Direction (TD) Curl |
|---|---|
| Example 5 | 0 degrees |
| Comparative Example 1 | 55 degrees | force required to produce deformation and failure of a container. It is expressed in lbf (or "pounds force") or newtons (where 1 lbf=4.44822 newtons) and is measured by placing a sample (e.g., a container as described below) in an Instron® Tensile Tester configured for compression testing, with a load cell of 2000 pounds (about 908 kilograms) and a crosshead speed of one inch (2.54 centimeters) per minute. To determine the compression strength of Example 5 and Comparative Example 2, four samples of each sheet were thermoformed into circular trays having identical dimensions (e.g., a diameter of about 4.5 inches (about 11.43 centimeters), a depth of about 1.75 inches (about 4.445 centimeters) and a capacity of about 7-10 ounces (about 207-296 milliliters)). Each tray was then placed in the Instron® Tensile Tester configured for compression testing, with a load cell of 2000 pounds (about 908 kilograms) and a crosshead speed of one inch (2.54 centimeters) per minute. To allow for comparison, the compression strength for each of the sample trays was normalized to 40 mil (about 1016 micron) thickness (i.e., as if each starting sheet has a thickness of 40 mil (about 1016 micron)). The normalized compression strengths were then averaged. TABLE 8 reports the top compression strength data for the trays of Example 5 and of Comparative Example 2.

TABLE 8

|  |  | Sample Thickness mil (micron) | Compression Strength lbf (newtons) | Compression Strength (normalized to 40 mil (1016 micron)) lbf (newtons) |
|---|---|---|---|---|
| Example 5 | Sample 1 | 42.1 (1069) | 142.1 (632.1) | 135.0 (600.5) |
|  | Sample 2 | 38.8 (986) | 133.3 (592.9) | 137.4 (611.2) |
|  | Sample 3 | 38.8 (986) | 142.0 (631.6) | 146.4 (651.2) |
|  | Sample 4 | 39.7 (1008) | 139.4 (620.1) | 140.5 (625.0) |
|  | Average |  |  | 139.8 (621.9) |
| Comparative Example 2 | Sample 1 | 41.2 (1046) | 34.0 (151.2) | 33.0 (146.8) |
|  | Sample 2 | 41.5 (1054) | 40.9 (181.9) | 39.4 (175.3) |
|  | Sample 3 | 41.6 (1057) | 42.8 (190.4) | 41.2 (183.3) |
|  | Sample 4 | 41.3 (1049) | 41.2 (183.3) | 39.9 (177.5) |
|  | Average |  |  | 38.4 (170.8) |

As shown in TABLE 8, the trays formed from the sheet of Example 5 (with a first layer of a blend of polypropylene homopolymer and high density polyethylene and a second layer of polyethylene terephthalate copolymer) exhibited a significantly higher compression strength than the trays formed from the sheet of Comparative Example 2 (with a first layer of a blend of polypropylene homopolymer and high density polyethylene and an identical second layer of a blend of polypropylene homopolymer and high density polyethylene). Therefore, in general, a package formed from a sheet having a first layer comprising different materials (i.e., having a different composition) than a second layer may exhibit a compression strength (or "top load compression") that is greater than about 125% of a compression strength of an other package formed from an other sheet having an other first layer comprising the same polyolefin (e.g., polypropylene) and having an analogous composition as an other second layer, where the other first layer still contributes at least about 30% of the thickness of the other sheet and the other second layer still contributes at least about 25% but less than about 60% of the thickness of the other sheet. In some embodiments, such compression strength may be greater than about 150% or greater than about 200% or greater than about 300% or from about 150% to about 300% of the compression strength of the other package.

Material distribution in thermoforming is a measure of the performance of a sheet during thermoforming (i.e., how the material distributes or disperses or spreads during thermoforming). It is measured by determining the thickness of various locations or areas of a thermoformed part. TABLE 9 lists the average normalized thickness of various locations at various heating times for identical cups formed from the sheet of Example 5 and the sheet of Comparative Example 2. Each thickness was normalized to a starting sheet thickness of 40 mil (about 1016 micron) (i.e., as if each of Example 5 and Comparative Example 2 has a thickness of 40 mil (about 1016 micron)). For each cup, S1 was an average of thickness of the cup side at two data points (e.g., on opposite sides of the cup) at about 10 millimeters below the cup flange; S2 was an average of thickness of the cup side at two data points (e.g., on opposite sides of the cup) at about 10 millimeters below S1; S3 was an average of thickness of the cup side at two data points (e.g., on opposite sides of the cup) at about 10 millimeters below S2; S4 was an average of thickness at two data points (e.g., on opposite sides of the cup) at about 10 millimeters below S3; B1 was an average of thickness of the cup bottom at two data points at about 5 millimeters from opposite corner radii; and B2 was a thickness of the cup bottom at its approximate center. For the sheet of Example 5, two cups had a heating time of 19 seconds, two cups had a heating time of 20 seconds, four cups had a heating time of 25 seconds and two cups had a heating time of 29 seconds. For the sheet of Comparative Example 2, three cups had a heating time of 25 seconds and six cups had a heating time of 29 seconds. The identical heating temperature was used to form all cups; only the heating time varied.

is measured by determining the oxygen transmission rate of a material at various time intervals after such exposure, in accordance with the following test method. Identical trays are formed from sheets (such as those as described in the present application). Each tray is filled with water and sealed with a foil lid. Each filled, sealed tray is placed in a retort chamber, which is heated from about 72° F. (about 22° C.) to about 250° F. (about 121° C.) and pressurized from about 14.4 psi (about 99 KPa) to about 30 psi (about 207 KPa) in 20 minutes. The chamber is then held at about 250° F. (about 121° C.) and about 30 psi (about 207 KPa) for 60 minutes. The chamber is then cooled to about 90° F. (about 32° C.) and depressurized to about 14.4 psi (about 99 KPa) in 40 minutes. Each tray surviving the retort process is removed from the chamber and prepared for oxygen transmission rate testing.

Oxygen Transmission Rate (OTR) is a measure of the rate of the transmission of oxygen gas through film, sheet, laminates, coextrusions, etc. It is generally expressed in cc/100 in$^2$/day and is measured in accordance with ASTM D3985, "Standard Test Method for Oxygen Gas Transmission Rate Through Plastic Film and Sheeting Using a Coulometric Sensor." For the present application, OTR was measured for the whole package (e.g., filled and sealed trays that were first emptied). As such, OTR was expressed as "cc/pkg/day" (i.e., the amount of oxygen transmitted through the whole package per day).

TABLE 9

Normalized Thickness of Thermoformed Part
mil
(micron)

| | Example 5 | Comparative Example 2 | Example 5 | Comparative Example 2 | Example 5 | Comparative Example 2 | Example 5 | Comparative Example 2 | Example 5 | Comparative Example 2 | Example 5 | Comparative Example 2 |
|---|---|---|---|---|---|---|---|---|---|---|---|---|
| 19 seconds | 17.9 (455) | did not form | 11.7 (297) | did not form | 10.8 (274) | did not form | 13.1 (333) | did not form | 19.6 (498) | did not form | 29.5 (749) | did not form |
| 20 seconds | 16.6 (422) | did not form | 12.7 (323) | did not form | 11.4 (290) | did not form | 15.1 (384) | did not form | 21.1 (536) | did not form | 30.8 (782) | did not form |
| 25 seconds | 16.9 (429) | 9.6 (244) | 13.4 (340) | 6.1 (155) | 15.6 (396) | 7.3 (185) | 16.1 (409) | 8.1 (206) | 25.8 (655) | 21.9 (556) | 35.8 (909) | 31.9 (810) |
| 29 seconds | 18.1 (460) | 12.2 (310) | 15.7 (399) | 8.7 (221) | 16.6 (422) | 9.3 (236) | 16.6 (422) | 11.5 (292) | 27.8 (706) | 20.8 (528) | 39.1 (993) | 33.9 (861) |

As shown in TABLE 9, the sheet of Example 5 (with a first layer of a blend of polypropylene homopolymer and high density polyethylene and a second layer of polyethylene terephthalate copolymer) formed with less energy than the sheet of Comparative Example 2 (with a first layer of a blend of polypropylene homopolymer and high density polyethylene and a second layer of a blend of polypropylene homopolymer and high density polyethylene). In fact, the sheet of Comparative Example 2 did not form at either 19 seconds or 20 seconds heating time. Additionally, the cups formed from the sheet of Example 5 formed with even distribution and with more consistency (e.g., a "tighter range") that the sheet of Comparative Example 2. Further, the cups formed from the sheet of Example 5 had greater thickness than the cups formed from the sheet of Comparative Example 2 at all locations of the cup. Generally, a greater thickness correlates to a better thermoformed and stronger formed part.

Retort recovery is a measure of a material's oxygen barrier after exposure to high temperature, moisture and pressure, such as those in the retort sterilization process. It Identical trays were formed from the sheets of Example 7, Example 8, Example 9, Comparative Example 2, Comparative Example 3 and Comparative Example 4. Trays formed from the sheets of Example 7, Example 8 and Example 9 and Comparative Example 2 survived the retort process described above. Each tray formed from the sheets of Example 7, Example 8 and Example 9 and Comparative Example 2 maintained dimensionality and shape and not distort or deform when exposed to the temperatures of the retort chamber (e.g., about 72-250° F. (about 22-121° C.)). Therefore, the sheet for such trays was thermally stable. However, trays formed form the sheet of Comparative Example 3 (with the first layer contributing 28.8% of the thickness of the sheet and the second layer contributing 60.1% of the thickness of the sheet) and trays formed from the sheet of Comparative Example 4 (with the first layer contributing 20.9% of the thickness of the sheet and the second layer contributing 68.1% of the thickness of the sheet) did not survive the retort process described above. Each tray formed from the sheets of Comparative Example 3 and Comparative Example 4 distorted and deformed and did not maintain dimensionality or shape. Therefore, the sheet for such trays was not thermally stable.

Figure 6:
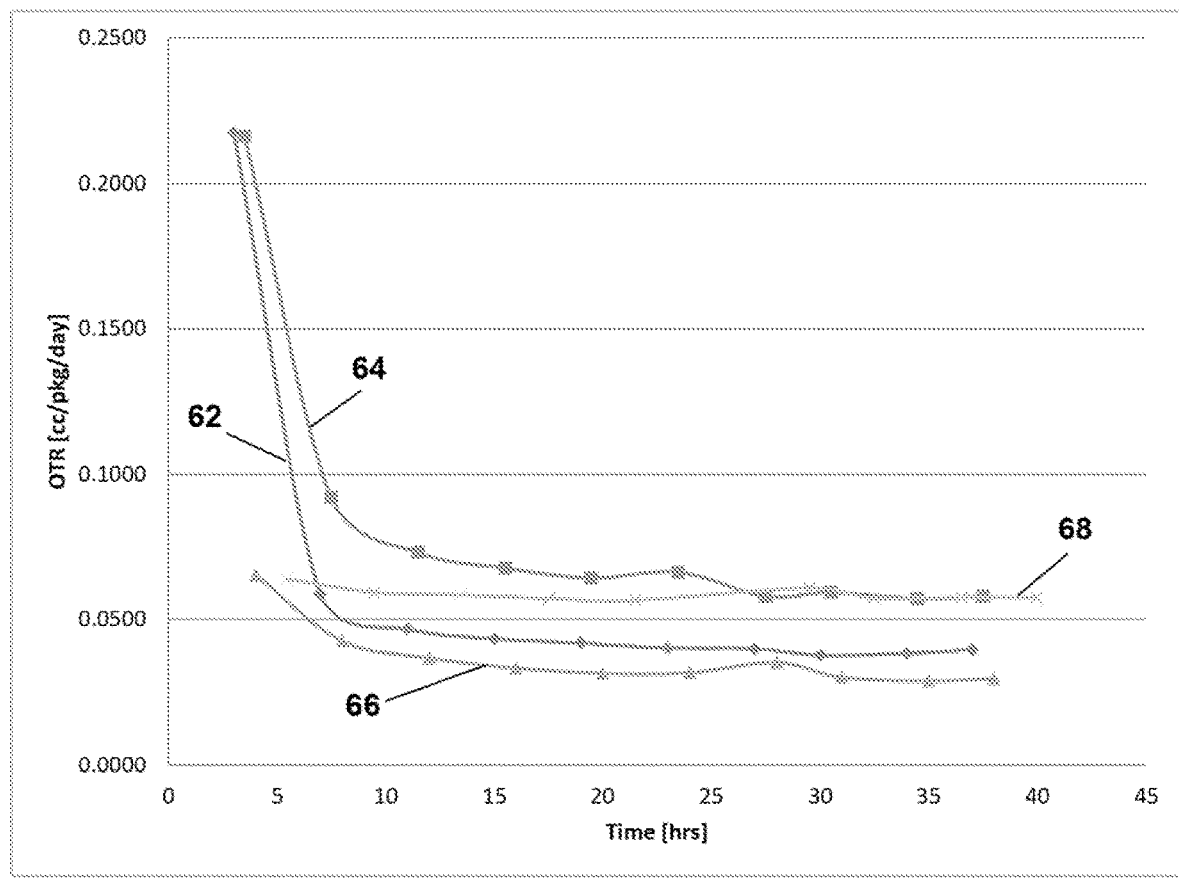
FIG. 6 is a graph depicting the oxygen transmission rates at various time intervals for identical trays formed from thermoplastic sheets according to the present application and formed from a comparative example.

FIG. 6 is a graph depicting the oxygen transmission rates at various time intervals for identical trays formed from thermoplastic sheets according to the present application and a comparative example. Line 62 of FIG. 6 shows the oxygen transmission rate at various time intervals for trays formed from the sheet of Example 7. Line 64 of FIG. 6 shows the oxygen transmission rate at various time intervals for trays formed from the sheet of Example 8. Line 66 of FIG. 6 shows the oxygen transmission rate at various time intervals for trays formed from the sheet of Example 9. Line 68 of FIG. 6 shows the oxygen transmission rate at various time intervals for trays formed from the sheet of Comparative Example 2. The time interval is the amount of time elapsed since the trays were removed from the retort chamber. As depicted in FIG. 6, trays formed from the sheets of Examples 7-9 (with a first layer of a blend of polypropylene homopolymer and polypropylene random copolymer and a second layer of a polyethylene terephthalate copolymer) exhibited comparable to or improved OTR at 40 hours compared to a tray formed from the sheet of Comparative Example 2 (with a first layer of a blend of polypropylene homopolymer and high density polyethylene and a second layer of a blend of polypropylene homopolymer and high density polyethylene). As such, Examples 7-9 exhibited excellent retort recovery.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests or discloses any such embodiment. Further, to the extent that any meaning or definition of a term in this present application conflicts with any meaning or definition of the same term in a document incorporated by reference, the meaning or definition assigned to that term in this present application shall govern.

The above description, examples and embodiments disclosed are illustrative only and should not be interpreted as limiting. The present invention includes the description, examples and embodiments disclosed; but it is not limited to such description, examples or embodiments. Modifications and other embodiments will be apparent to a person of ordinary skill in the art, and all such modifications and other embodiments are intended and deemed to be within the scope of the present invention as defined by the claims. What is claimed is as follows:

The invention claimed is:

1. A sheet comprising
a first layer comprising a polyolefin having a melting temperature, a storage modulus ($G'_1$) greater than about 100,000 psi (about 690 MPa) at ambient temperature, and a glass transition temperature less than ambient temperature; wherein the polyolefin comprises polypropylene, high density polyethylene or blend of thereof; and
a second layer comprising a polymer having a glass transition temperature greater than ambient temperature; wherein the polymer comprises polyester, cyclic olefin copolymer, styrenic polymers or blends of thereof;
wherein the first layer comprises different materials than the second layer;
wherein the melting temperature of the polyolefin of the first layer is greater than the glass transition temperature of the polymer of the second layer;
wherein the polyolefin of the first layer has a storage modulus ($G'_1$) at about 35° C. and a storage modulus ($G'_1$) at a midpoint temperature that is the average of the glass transition temperature of the polymer of the second layer and the melting temperature of the polyolefin of the first layer;
wherein the polymer of the second layer has a storage modulus ($G'_2$) at about 35° C. and a storage modulus ($G'_2$) at a midpoint temperature that is the average of the glass transition temperature of the polymer of the second layer and the melting temperature of the polyolefin of the first layer;
wherein the ratio of $G'_1$ of the polyolefin of the first layer to $G'_2$ of the polymer of the second layer at about 35° C. is less than 1, and the ratio of $G'_1$ of the polyolefin of the first layer to $G'_2$ of the polymer of the second layer at the midpoint temperature is greater than one;
wherein the sheet has a thickness equal to or greater than 10 mil (254 micron) and the first layer contributes at least about 30% of the thickness of the sheet and the second layer contributes at least about 25% but less than about 60% of the thickness of the sheet.

2. The sheet of claim 1, wherein the polyolefin of the first layer comprises from about 50% by weight to about 70% by weight polypropylene homopolymer and from about 30% by weight to about 50% by weight high density polyethylene.

3. The sheet of claim 1, wherein the polymer of the second layer comprises amorphous or semi-crystalline polyester (APET), glycol-modified polyethylene terephthalate (PETE), isophthalic acid (IPA)-modified co-polyester (PETE), polylactic acid (PLA), copolyesters, high impact polystyrene (HIPS), general purpose polystyrene (GPPS), styrene block copolymer (SBC) or blends of thereof.

4. The sheet of claim 1, wherein the polyolefin a f the first layer comprises from about 50% by weight to about 70% by weight polypropylene homopolymer and from about 30% by weight to about 50% by weight high density polyethylene and the polymer of the second layer comprises amorphous or semi-crystalline polyester (APET).

5. The sheet of claim 1, wherein the sheet has a thickness of from about 30 mil (about 762 micron) to about 56 mil (about 1270 micron).

6. The sheet of claim 1, wherein the first layer contributes from about 30% to about 65% of the thickness of the sheet and the second layer contributes from about 25% to about 55% of the thickness of the sheet.

7. The sheet of claim 1, wherein the first layer s an exterior layer or an interior layer and the second layer is an exterior layer or an interior layer.

8. The sheet of claim 1, wherein the sheet further comprises an adhering layer positioned between the first layer and the second layer.

9. The sheet of claim 8, wherein the adhering layer comprises an adhesive, an extrudate, a coating, a tie material or a multilayer film.

10. The sheet of claim 8, wherein the adhering layer comprises a multilayer, blown film.

11. The sheet of claim 1, wherein the sheet has a normalized combined tear initiation and propagation resistance in both machine direction and transverse direction of greater than about 0.115 in*lbf/mil (0.0511 Ncm/micron) energy to break and an elongation in both machine direction and transverse direction of greater than about 0.800% mil (0.0315%/micron) as measured in accordance with ASTM 01004.

12. The sheet of claim 1, wherein the sheet has between 0 and about 20 degrees of transverse direction curl.

13. The sheet of claim 1, wherein the sheet is thermoformable.

14. The sheet of claim 1, wherein the sheet is thermoformed into a package.

15. The package of claim 14, wherein the package exhibits a compression strength that is greater than about 125% of a compression strength of an other package formed from an other sheet having an other first layer comprising the same polyolefin and having an analogous composition as an other second layer, wherein the other first layer contributes at least about 30 of the thickness of the other sheet and the other second layer contributes at least about 25% but less than about 60% of the thickness of the other sheet.

16. The package of claim 15, wherein the package exhibits a compression strength that is from about 150% to about 300% of the compression strength of the other package.

17. The sheet of claim 1, wherein the sheet is thermally stable when exposed to temperatures from about 194° F. (about 90° C.) to about 284° F. (about 140° C.).

18. The sheet of claim 17, wherein the sheet forms a package for retort, aseptic, hot-fill or microwave processing.

* * * * *

UNITED STATES PATENT AND TRADEMARK OFFICE
CERTIFICATE OF CORRECTION

PATENT NO. : 10,569,516 B2  
APPLICATION NO. : 15/574510  
DATED : February 25, 2020  
INVENTOR(S) : Kevin D. Glaser and Ayomide O. Odusanya Page 1 of 1

It is certified that error appears in the above-identified patent and that said Letters Patent is hereby corrected as shown below:

In the Specification

Column 4, Line 25: delete "100.00" and insert -- 100,000 --  
Column 5, Line 28: delete "'COC'" and insert -- "COC" --  
Column 9, Line 27: delete "116.030" and insert -- 116,030 --  
Column 9, Line 32: delete "at al" and insert -- et al --  
Column 9, Line 33: delete "(2009" and insert -- ©2009 --  
Column 10, Line 6: delete "82008" and insert -- S2008 --  
Column 14, Line 53: delete "$2008" and insert -- S2008 --  
Column 15, Line 3: delete "$2008" and insert -- S2008 --  
Column 18, Line 24: delete "PET11" and insert -- PETI1 --  
Column 20, Line 16: delete "ULOPE1" and insert -- ULDPE1 --  
Column 21, Line 33: delete "1.08 micron" and insert -- 108 micron --  
Column 22, Line 3: delete "had had" and insert -- had --  
Column 23, Line 24: delete "curt" and insert -- curl --  
Column 23, Line 56: delete "force" and insert -- Top load compression (also referred to as "compression strength") is a measure of the force --  
Column 26, Line 58: delete "form" and insert -- from --

In the Claims

Column 28, Line 35, Claim 3: delete "(PETE)" and insert -- (PETG) --  
Column 28, Line 36, Claim 3: delete "(PETE)" and insert -- (PETI) --  
Column 28, Line 39, Claim 4: delete "a f" and insert -- of --  
Column 28, Line 46, Claim 5: delete "56" and insert -- 50 --  
Column 28, Line 52, Claim 7: after "layer" delete "s" and insert -- is --  
Column 29, Line 1, Claim 11: delete "%" and insert -- %/ --  
Column 29, Line 3, Claim 11: delete "01004" and insert -- D1004 --  
Column 29, Line 16, Claim 15: delete "30" and insert -- 30% --

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*